US011919191B2

(12) United States Patent
Brimhall

(10) Patent No.: US 11,919,191 B2
(45) Date of Patent: Mar. 5, 2024

(54) METHODS FOR ENHANCING THE PRESERVATION OF CELLULOSIC MATERIALS AND CELLULOSIC MATERIALS PREPARED THEREBY

(71) Applicant: American Chemet Corporation, East Helena, MT (US)

(72) Inventor: Daniel Brimhall, Clancy, MT (US)

(73) Assignee: American Chemet Corporation, East Helena, MT (US)

( * ) Notice: Subject to any disclaimer, the term of this patent is extended or adjusted under 35 U.S.C. 154(b) by 0 days.

(21) Appl. No.: 17/953,095

(22) Filed: Sep. 26, 2022

(65) Prior Publication Data

US 2023/0034800 A1 Feb. 2, 2023

Related U.S. Application Data

(63) Continuation of application No. 17/035,321, filed on Sep. 28, 2020, now Pat. No. 11,453,142, which is a continuation of application No. 16/655,981, filed on Oct. 17, 2019, now Pat. No. 10,786,926, which is a continuation of application No. 15/612,804, filed on Jun. 2, 2017, now Pat. No. 10,449,691, which is a continuation of application No. PCT/US2016/068240, filed on Dec. 22, 2016.

(60) Provisional application No. 62/372,067, filed on Aug. 8, 2016, provisional application No. 62/387,321, filed on Dec. 23, 2015.

(51) Int. Cl.

| | |
|---|---|
| ***B27K 3/22*** | (2006.01) |
| ***B05D 1/18*** | (2006.01) |
| ***B05D 3/04*** | (2006.01) |
| ***B05D 5/00*** | (2006.01) |
| ***B05D 7/06*** | (2006.01) |
| ***B27K 3/02*** | (2006.01) |
| ***B27K 3/08*** | (2006.01) |
| ***B27K 3/20*** | (2006.01) |
| ***B27K 3/32*** | (2006.01) |
| ***B27K 3/34*** | (2006.01) |
| ***B27K 3/52*** | (2006.01) |
| ***B27K 5/00*** | (2006.01) |

(52) U.S. Cl.

CPC .................. *B27K 3/22* (2013.01); *B05D 1/18* (2013.01); *B05D 3/0453* (2013.01); *B05D 3/0466* (2013.01); *B05D 3/0486* (2013.01); *B05D 3/0493* (2013.01); *B05D 5/00* (2013.01); *B05D 7/06* (2013.01); *B27K 3/02* (2013.01); *B27K 3/0207* (2013.01); *B27K 3/0214* (2013.01); *B27K 3/0278* (2013.01); *B27K 3/0292* (2013.01); *B27K 3/08* (2013.01); *B27K 3/20* (2013.01); *B27K 3/32* (2013.01); *B27K 3/34* (2013.01); *B27K 3/52* (2013.01); *B27K 5/007* (2013.01); *B27K 5/0075* (2013.01); *B05D 2203/00* (2013.01); *B05D 2401/20* (2013.01); *B05D 2601/20* (2013.01); *B27K 2240/20* (2013.01)

(58) Field of Classification Search

CPC ...... B27K 3/02; B27K 3/0207; B27K 3/0214; B27K 3/0278; B27K 3/0292; B27K 3/08; B27K 3/22; B27K 3/20; B27K 3/52; B27K 3/34; B27K 3/32; B27K 5/007; B27K 5/0075; B27K 2240/20; B05D 3/0466; B05D 1/18; B05D 3/0493; B05D 7/06; B05D 3/0453; B05D 5/00; B05D 3/0486; B05D 2203/00; B05D 2401/20; B05D 2601/20

See application file for complete search history.

(56) References Cited

U.S. PATENT DOCUMENTS

| | | | |
|---|---|---|---|
| 2,202,579 | A | 5/1940 | Häger |
| 3,652,229 | A | 3/1972 | Burke |
| 4,008,342 | A | 2/1977 | Richardson |
| 4,143,153 | A | 3/1979 | Pommer et al. |
| 4,409,358 | A | 10/1983 | Kraft et al. |
| 2,908,607 | A | 10/1989 | Hager |
| 4,929,454 | A | 5/1990 | Findlay et al. |
| 4,937,143 | A | 6/1990 | West |
| 4,942,064 | A | 7/1990 | Brayman et al. |
| 5,187,194 | A | 2/1993 | Goettsche et al. |

(Continued)

FOREIGN PATENT DOCUMENTS

| | | | | |
|---|---|---|---|---|
| AU | 491638 B1 * | 3/1976 | | ............... B27K 3/32 |
| AU | 491638 B1 | 3/1976 | | |

(Continued)

OTHER PUBLICATIONS

Ung et al., "Copper stabilization in ACQ-D treated wood: retention, temperature and species effects," Holz als Roh- und Werkstoff, 63(3): 186-191 (2005). (Year: 2005).*

(Continued)

*Primary Examiner* — William P Fletcher, III
(74) *Attorney, Agent, or Firm* — Green, Griffith & Associates LLP

(57) ABSTRACT

Methods for treating cellulosic materials comprising introducing a liquid treating composition into the cellulosic material, the treating composition comprising a solution prepared from at least: (i) one or more of a copper amine complex or copper ammine complex, such as copper tetraamine carbonate, (ii) one or more of ammonia or a water-soluble amine and (iii) water; and exposing the cellulosic material provided thereby to carbon dioxide and/or carbonic acid to provide treated cellulosic material, and treated cellulosic materials prepared thereby.

17 Claims, No Drawings

(56) References Cited

U.S. PATENT DOCUMENTS

| | | | |
|---|---|---|---|
| 7,246,452 | B1 | 7/2007 | Roy |
| 7,411,080 | B2 | 8/2008 | Zhao |
| 7,632,567 | B1 | 12/2009 | Zhang et al. |
| 7,674,481 | B2 | 3/2010 | Leach et al. |
| 7,776,306 | B2 | 8/2010 | Miller et al. |
| 10,449,691 | B2 | 10/2019 | Brimhall |
| 10,786,926 | B2 | 9/2020 | Brimhall |
| 2001/0044034 | A1 | 11/2001 | Peldszus et al. |
| 2004/0258768 | A1 | 12/2004 | Richardson et al. |
| 2005/0255251 | A1 | 11/2005 | Hodge et al. |
| 2006/0086284 | A1 | 4/2006 | Zhang et al. |
| 2006/0086841 | A1 | 4/2006 | Richardson et al. |
| 2006/0288904 | A1 | 12/2006 | Leach et al. |
| 2008/0131666 | A1 | 6/2008 | Fox et al. |
| 2015/0037230 | A1 | 2/2015 | Pignotti |
| 2017/0266838 | A1 | 9/2017 | Brimhall |
| 2020/0047370 | A1 | 2/2020 | Brimhall |
| 2021/0008755 | A1 | 1/2021 | Brimhall |

FOREIGN PATENT DOCUMENTS

| | | | | | |
|---|---|---|---|---|---|
| AU | 2251499 | A | * | 6/1999 | ............... B27K 3/16 |
| AU | 2251499 | A | | 6/1999 | |
| DE | 10 2006 008 843 | A1 | | 8/2007 | |
| DE | 102006008843 | A1 | * | 8/2007 | ............... B27K 3/22 |
| WO | WO 96/23635 | A1 | | 8/1996 | |

OTHER PUBLICATIONS

B.J. Hathaway and A.A.G. Tomlinson, Copper (II) Ammonia Complexes, 5 Coordin. Chem. Rev. 1 (1970). (Year: 1970).*
Ammine, Hawley's Condensed Chemical Dictionary 63 (N. Irving Sax and Richard J. Lewis, Sr. eds., 11th ed. 1987). (Year: 1987).*
Amine Complexes with 3d Block Metal Ions, Doc Brown's Chemistry Advanced Level Pre-University Chemistry Revision Study Notes. (2000), https://www.docbrown.info/page06/organonitrogen6.htm (last visited Oct. 18, 2023). (Year: 2000).*
Myung Jae Lee, Adsorption of Alkaline Copper Quat Components in Wood—Mechanisms and Influencing Factors (2011) (Ph.D. dissertation, University of Toronto). (Year: 2011).*
U.S. Appl. No. 17/035,321, filed Sep. 28, 2020.
U.S. Appl. No. 16/655,981, filed Oct. 17, 2019.
U.S. Appl. No. 15/612,804, filed Jun. 2, 2017.
American Wood Protection Association, *AWPA Book of Standards*, Test A9-13 (p. 189-193), Test A21-14 (p. 210-213), Test A61-11 (p. 286-287), Test A72-12 (p. 302), Test E1-15 (p. 387-395), Test E10-15 (p. 418-428), Test E11-15 (p. 429-431) (2015).
Archer et al., "An overview of copper based wood preservatives," *Wood Protection*, Forest Products Society Conference, http://www.forestprod.org/woodprotection06archer.pdf (2006).
Archer, "Cell wall penetration of particulate copper wood preservative systems in southern pine," Unpublished oral presentation at 38th Annual Meeting, Int. Res. Group on Wood Pres., IRG Secretariat, Wyoming, 39 pp. (2007).
Arsenault, "Factors influencing the effectiveness of preservative systems," in *Wood Deterioration and Its Prevention by Preservative Treatments*, D.D. Nicholas (ed.), vol. 2, pp. 121-278, Syracuse University Press, New York (1973).
Bull, "The chemistry of chromated copper arsenate II. Preservative-wood interactions," *Wood Science and Tech.*, 34(6): 459-466 (2001).
Buschhaus et al., "Triazoles: synergism between propiconazole and tebuconazole," IRG/WP 95-30092, PaperpPrepared for the $26^{th}$ Annual Meeting, Int. Res. Group on Wood Pres., IRG Secretariat, Helsingør, Denmark, 2 pp. (1995).
Cao et al., "Microdistribution of copper in copper-ethanolamine (Cu-EA) treated southern yellow pine (*Pinus* spp.) related to Density Distribution," *Holzforschung*, 59: 82-89 (2005).
Cao et al., "Copper fixation in ACQ-D treated Chinese fir at various temperature and relative humidity conditions," IRG/WP 07-30436, Paper prepared for the $38^{th}$ Annual Meeting, Int. Res. Group on Wood Pres., IRG Secretariat, Wyoming, 13 pp. (2007).
Choi et al., "The copper tolerance of mycelium vs. spores for two brown rot fungi," IRG/WP 02-10422, Int. Res. Group on Wood Pres., IRG Secretariat, Cardiff, Wales UK (2002).
Clausen et al., "Correlation between oxalic acid production and copper tolerance in *Wolfiporia cocos," Int'l Biodeterioration & Biodegradation*, 46: 69-76 (2000).
Clausen et al., "Oxalic acid overproduction by copper-tolerant brown-rot basidiomycetes on southern yellow pine treated with copper-based preservatives," *Int'l Biodeterioration & Biodegradation*, 51(2): 139-144 (2003).
Cooper, "Cation exchange adsorption of copper on wood," *Wood Protection*, 1(1): 9-14 (1991).
Cooper et al., Effect of humic acid on leaching of CCA from treated wood, *Forest Products Journal*, 51(9): 73-77 (2001).
De Groot et al., "Using copper-tolerant fungi to biodegrade wood treated with copper-based preservatives," *Int'l Biodeterioration & Biodegradation*, 44: 17-27 (1999).
Freeman, "Water-borne copper naphthenate: a chromium and arsenic free preservative for wood and composites," Poster presented at Environmental Impacts of Preservative-Treated Wood Conference, Orlando, FL (2004).
Freeman et al., "A Comprehensive Review of Copper-Based Wood Preservatives," *Forest Products Journal*, 58(11): 6-27 (2008).
Goff et al., "Oxidation Inhibitors for Copper and Iron Catalyzed Degradation of Monoethanolamine in $CO_2$ Capture Process," *Ind. Eng. Chem. Res.*, 45: 2513-2521 (2006).
Goodell et al., "Brown-rot decay of ACQ and CA-B treated lumber," *Forest Products Journal*, 57(6): 31-33 (2007).
Grace et al., "Laboratory evaluation of copper naphthenate pressure treatments against the Formosan subterranean termite," IRG/WP 93-10005, Paper prepared for the $24^{th}$ Annual Meeting, Int. Res. Group on Wood Pres., IRG Secretariat, Orlando, FL, 11 pp. (1993).
Groenier et al., "Preservative-treated wood and alternative products in the forest service," USDA Forest Service, TE42G01—Technical Services ECAP, pp. 1-50 (2006).
Hale et al., "Soft-rot cavity formation in five preservative-treated hardwood species," *Trans. Br. Mycol. Soc.*, 86: 585-590 (1986).
Hulme et al., "Soft-rot control in hardwoods treated with chromated copper arsenate preservatives," *Material und Organismen*, 12(2): 81-95 (1977).
Humar et al., "Influence of acidification of CCB (Cu/Cr/B) impregnated wood on fungal copper tolerance," *Chemosphere*, 58(6): 743-749 (2005).
Humar et al., "Influence of ethanolamine on lignin depolymerization and copper leaching from treated Norway spruce and beech wood," IRG/WP 07-30423, Paper prepared for the $38^{th}$ Annual Meeting, Int. Res. Group on Wood Pres., IRG Secretariat, Wyoming, 11 pp. (2007).
Lebow, "Leaching of wood preservative components and their mobility in the environment: summary of pertinent literature," USDA, Forest Service, Forest Products Laboratory General Technical Report, FPL-GTR-93, 40 pp. (1996).
Lebow et al., "Treated wood in transition: A look at CCA and the candidates to replace it," *Wood Design Focus*, Summer 2004: 3-8 (2004).
Lebow, "Preservative treatments for building components," in *Wood Protection 2006*, ed. H. M. Barnes, Proc. of the Forest Products Society, New Orleans, LA, Pub. No. 7229, pp. 57-64, www.fpl.fs.fed.us/documnts/pdf2007/fpl_2007_lebow001.pdf (2007).
Luo, "Overall Equilibrium Diagrams for Hydrometallurgical Systems: Copper-Ammonia-Water System," *Hydrometallurgy*, 17: 177-199 (1987).
Matsunaga et al., "Micro-distribution of metals in wood treated with a nano-copper wood preservative," IRG/WP 07-40360, Paper prepared for the $38^{th}$ Annual Meeting, Int. Res. Group on Wood Pres., IRG Secretariat, Wyoming, 10 pp. (2007).
Matsunaga et al., "Visualisation of metals in pine treated with preservative containing copper and iron nanoparticles," *Iawa J.*, 29(4): 387-396 (2008).
Mitsuhashi et al., "The effect of additives on copper losses from alkaline copper treated wood," IRG/WP 07-50246, Paper prepared

(56) References Cited

OTHER PUBLICATIONS for the 38th Annual Meeting, Int. Res. Group on Wood Pres., IRG Secretariat, Wyoming, 14 pp. (2007).
Morrell, "Copper tolerant fungi: a brief review on their effects and distribution," *Proceedings of the American Wood-Preservers' Association*, 87: 265-270 (1991).
Myers et al., "Oxine copper (Nytek® GD) for the control of mold and sapstain on lumber in North America," IRG/WP/3517, Paper prepared for the 20th Annual Meeting, Int. Res. Group on Wood Pres, IRG Secretariat, Lappeenranta, Finland, 9 pp. (1989).
Nicholas et al., "Comparative performance of several ammoniacal copper preservative systems," IRG/WP 97-30151, Int. Res. Group on Wood Pres., IRG Secretariat, Whistler, Canada (1997).
Osmose, Inc., Application for Pesticide Registration/Amendment (NW 200-C) (Mar. 10, 2011).
Petrič et al., "Microdistribution of some copper and zinc containing waterborne and organic solvent wood preservatives in spruce wood cell walls," *Holzforschung*, 54(1): 23-26 (2000).
Pizzi, "The chemistry and kinetic behavior of Cu—Cr—As/B wood preservatives. III. Fixation of the Cr/As system on wood," *Journal of Polymer Science: Polymer Chemistry Edition*, 20: 725-738 (1982).
Pizzi, "The chemistry and kinetic behavior of Cu—Cr—As/B wood preservatives. IV. Fixation of CCA to wood," *Journal of Polymer Science: Polymer Chemistry Edition*, 20: 739-764 (1982).
Pohleven et al., "Addition of boron compounds and octanoic acid for improvement of biocidal properties and copper fixation at copper-ethanolamine based wood preservatives," IRG/WP 06-30408, Paper prepared for the 37th Annual Meeting, Int. Res. Group on Wood Pres., IRG Secretariat, Tromsø, Norway, 11 pp. (2006).
Preston et al., "Recent studies with ammoniacal copper carboxylate preservatives," *Proceedings of the American Wood-Preservers' Association*, 81: 30-39 (1985).
Preston et al., "Field stake tests with copper-based preservatives," IRG/WP 08-30459, Paper prepared for the 39th Annual Meeting, Int. Res. Group on Wood Pres., IRG Secretariat, Istanbul, Turkey, 15 pp. (2008).
Rhatigan et al., "Marine performance of preservative treated southern pine panels, Part 1: Exposure in Newport, Oregon," IRG/WP 00-10368, Paper prepared for the 31st Annual Meeting, Int. Res. Group on Wood Pres., IRG Secretariat, Kona, HI, 10 pp. (2000).
Roussel et al., "Copper based wood preservative—A new approach using fixation with resin acids of rosin," IRG/WP 00-30249, Paper prepared for the 31st Annual Meeting, Int. Res. Group on Wood Pres., IRG Secretariat, Kona, HI, 8 pp. (2000).
Ruddick et al., "Fixation of amine copper preservatives, Part 1. Reaction of vanillin, a lignin model compound with monoethanolamine copper sulphate solution," *Holzforschung*, 55(6): 585-589 (2001).
Sax et al., eds., "Ammine," *Hawley's Condensed Chemical Dictionary*, 11th ed., Van Nostrand Reinhold, p. 63 (1987).
Smart et al., "Copper borate for the protection of engineered wood composites," IRG/WP 06-40334, Paper prepared for the 37th Annual Meeting, Int. Res. Group on Wood Pres., IRG Secretariat, Tromsø, Norway, 13 pp. (2006).
Stirling et al., "Micro-distribution of micronized copper in southern pine," IRG/WP 08-30479, Paper prepared for the 39th Annual Meeting, Int. Res. Group on Wood Pres., IRG Secretariat, Istanbul, Turkey, 16 pp. (2008).
Tascioglu et al., "Effects of delayed drying and $CO_2$ application on copper amine fixation in ACQ treated red pine," *Eur. J. Wood Prod.*, 67: 7-12 (2009).
Thomason et al., "Amine copper reaction with wood components: acidity versus copper adsorption," IRG/WP 97-30161, Paper prepared for the 28th Annual Meeting, Int. Res. Group on Wood Pres., IRG Secretariat, Whistler, Canada, 18 pp. (1997).
Ung et al., "Copper stabilization in ACQ-D treated wood: retention, temperature and species effects," *Holz als Roh- und Werkstoff*, 63(3): 186-191 (2005).
Wakeling, "Above and below-ground depletion of copper, chromium and arsenic from *Pinus radiata* and *Fagus sylvatica* at thirteen test sites in New Zealand and Australia," IRG/WP 06-30402, Paper prepared for the 37th Annual Meeting, Int. Res. Group on Wood Pres., IRG Secretariat, Tromsø, Norway, 27 pp. (2006).
Woodward et al., "Tolerance of Wolfiporia cocos isolates to copper in agar media," *Forest Products Journal*, 49(4): 87-94 (1999).
Xie et al., "Fixation of ammoniacal copper preservatives: Reaction of vanillin, a lignin model compound with ammoniacal copper sulphate solution," *Holzforschung*, 49: 483-490 (1995).
Zahora et al., "Marine performance of preservative treated southern pine panels, Part 2: Exposures at Mourilyan Harbour, Queensland, Australia," IRG/WP 00-10337, Paper prepared for the 31st Annual Meeting, Int. Res. Group on Wood Pres., IRG Secretariat, Kona, HI, 10 pp. (2000).
Zhang et al., "FTIR characterization of copper ethanolamine-wood interaction for wood preservation," *Holzforschung*, 54: 119-122 (2000).
Zhang et al., "Corrosiveness of metal by copper-based preservatives," IRG/WP 06-40329, Paper prepared for the 37th Annual Meeting, Int. Res. Group on Wood Pres., IRG Secretariat, Tromsø, Norway, 5 pp. (2006).
Zhang et al., "Wood preservative composition for treatment of in-service poles, posts, piling, cross-ties and other wooded structures," IP.com Prior Art Database Technical Disclosure, IPCOM000176007D, 13 pp. (2008).

* cited by examiner

METHODS FOR ENHANCING THE PRESERVATION OF CELLULOSIC MATERIALS AND CELLULOSIC MATERIALS PREPARED THEREBY

CROSS-REFERENCE TO RELATED APPLICATIONS

This application is a continuation of U.S. application Ser. No. 17/035,321 filed on Sep. 28, 2020, which issued as U.S. Pat. No. 11,453,142 on Sep. 27, 2022, which is a continuation of U.S. application Ser. No. 16/655,981 filed on Oct. 17, 2019, which issued as U.S. Pat. No. 10,786,926 on Sep. 29, 2020, which is a continuation of U.S. application Ser. No. 15/612,804 filed on Jun. 2, 2017, which issued as U.S. Pat. No. 10,449,691 on Oct. 22, 2019, which is a continuation of International Patent Application No. PCT/US2016/068240 filed on Dec. 22, 2016, and claims the benefit of U.S. Provisional Patent Application No. 62/387,321, which was filed on Dec. 23, 2015, and U.S. Provisional Patent Application No. 62/372,067, which was filed on Aug. 8, 2016, the disclosures of which are incorporated by reference in their entireties herein.

BACKGROUND OF THE INVENTION

The invention relates to methods for enhancing the preservation of cellulosic materials, as well as to cellulosic materials prepared thereby.

BRIEF SUMMARY OF THE INVENTION

The present invention provides, in one embodiment, methods for preparing a treated cellulosic material comprising: (a) introducing a liquid treating composition into the cellulosic material, the treating composition comprising a solution prepared from at least (i) one or more of a copper amine complex or a copper ammine complex, (ii) one or more of ammonia or a water-soluble amine and (iii) water; and (b) exposing the cellulosic material provided by step (a) to one or more of carbon dioxide or carbonic acid to provide the treated cellulosic material.

In related embodiments, the invention provides treated cellulosic material prepared in accordance with the inventive methods as described herein, as well as methods for enhancing the preservation of cellulosic material.

DETAILED DESCRIPTION OF THE INVENTION

In one embodiment, the present invention provides methods for preparing a treated cellulosic material comprising: (a) introducing a liquid treating composition into the cellulosic material, the treating composition comprising a solution prepared from at least (i) one or more of a copper amine complex or a copper ammine complex, (ii) one or more of ammonia or a water-soluble amine and (iii) water; and (b) exposing the cellulosic material provided by step (a) to one or more of carbon dioxide or carbonic acid to provide the treated cellulosic material.

The inventive methods, and cellulosic materials prepared thereby, provide a treated cellulosic material that exhibits excellent preservation when exposed to various environmental conditions, insects and fungi. While not desiring to be bound to any particular theory, it is believed that the preservation of this treated material is attributable, at least in part, to the inventive methods which incorporate at least one preservation agent, such as copper and, optionally, but desirably, a second preservation agent such as zinc, within the cellulosic material in a manner that resists leaching of the copper (and zinc, if present) from the treated material, provides for excellent retention of copper (and zinc, if present) therein, and desirably also permits, for certain species, penetration of the copper (and zinc, if present) substantially throughout the entire volume of the treated cellulosic material.

The inventive methods also permit the enhanced preservation of cellulosic materials that traditionally have been preserved using other conventional systems. These systems are relatively energy intensive, time-consuming and inefficient. Illustrative of such conventional systems are alkaline copper quaternary (ACQ), copper azole type B (CA-B) and other water-based copper systems, with the latter including systems that require the introduction of slurries or dispersions of micronized particles of basic copper carbonate (BCC) and other sparingly-soluble metal salts into wood that is to be preserved.

The inventive methods initially contemplate introducing a liquid treating composition into the cellulosic material. By this it is meant that the liquid treating composition will penetrate below the outer surface of, and into, the cellulosic material. While the desired degree of penetration may vary depending upon the nature of the cellulosic material (as the porosity of cellulosics may vary), the time period during which the cellulosic materials is exposed to the treating composition, and the desired final use of the treated material, it is preferred that the liquid treating composition impregnate the cellulosic material, in other words, that the treating composition is absorbed into and becomes distributed throughout the entire volume of the cellulosic material, and most preferably that the composition is distributed substantially uniformly throughout. This being said, impregnation is not required, as the composition may desirably penetrate into, at least, about 10%, more desirably about 20%, even more desirably about 30%, more desirably about 40%, even more desirably about 50%, preferably about 60%, more preferably about 75%, even more preferably about 90% and most preferably about 99%, of the cellulosic material by volume. In addition to assessing penetration by volume, the treatment may further be described by a percentage increase in weight of the cellulosic material post-treatment, wherein the weight of the material after treatment desirably increases by, at least, about 5%, more desirably by about 10%, even more desirably by about 25%, more desirably by about 50%, preferably by about 75%, more preferably by about 90%, even more preferably by about 100%, and most preferably by about 120%, relative to the pre-treatment weight of the material. The degree of penetration also may be determined by A72 in the aforementioned AWPA Book of Standards. It should be recognized that penetration of the treating composition throughout the entire volume of the cellulosic material is not practical for certain relatively non-porous and/or non-absorptive cellulosic materials, for example, Douglas fir, Hem Fir and Spruce-Pine-Fir. Despite this limitation, the inventive method may be advantageously used in connection with relatively less porous materials, such as those identified herein.

The extent of penetration of the liquid treating composition by volume into the cellulosic material may be determined upon visual observation of an appropriate cross-section of the material obtained after introduction of the composition. Generally, the extent to which coloration (due to the treating composition) is visually observed in the area of a cross-section of a treated cellulosic material, either prior to or more desirably after the exposure step, indicates the extent of penetration of the treating composition into the cellulosic material, with generally uniform coloration appearing on the entirety of the cross-section indicating impregnation.

The liquid treating composition used in the inventive methods comprises a solution prepared from at least the following components: (i) one or more of a copper amine complex or copper ammine complex (desirably copper diammine carbonate or copper tetraammine carbonate), (ii) one or more of ammonia or a water-soluble amine and (iii) water. This combination of components provides a liquid in which the copper-containing components (one or more of a copper amine complex or copper ammine complex) become dissolved. Because the treating composition is a solution of these copper-containing components, and not a dispersion, no dispersant for the copper amine complex and/or copper ammine complex is required in the treating composition.

The treating composition may be prepared in a variety of ways. By way of example, one may prepare the solution by initially combining water with the one or more of copper ammine complex or copper amine complex in a vessel, followed by introducing one or more of ammonia or a water-soluble amine thereto, with mixing to provide the solution of the copper-containing compounds. Alternatively, each of the components may be added into a vessel relatively simultaneously, with agitation.

The preparation of the solution requires the use of one or more of ammonia or a water-soluble amine. When ammonia is used, it may be introduced into the vessel in any form, e.g., anhydrous or as aqueous ammonia. The water-soluble amine that may be used is one or more of a variety of water-soluble amines. Illustrative of suitable water-soluble amines include, without limitation, alkanolamines, e.g., ethanolamines (monoethanolamine, diethanolamine, triethanolamine) or propanolamines, with ethanolamines being preferred, and monoethanolamine being more preferred.

The absolute and relative amount of the ammonia and/or water-soluble amine components to be used in connection with the present invention is that which is sufficient to provide a solution prepared using one or more of a copper ammine complex or a copper amine complex. In this regard, in general, the weight ratio of ammonia (or ammonia equivalent) to copper (as metal) may range from about 2:1 to about 5:1, as well as about 2:1, 2.5:1, 3:1, 3.5:1, 4:1, 4.5:1 or 5:1, and all ranges encompassed thereby in 0.1 increments. The use of the ammonia and water-soluble amine is desirably minimized, for reasons discussed further therein. Water should constitute the majority of the treating composition, as also discussed further herein.

In addition to being solubilized when introduced into appropriate amounts of (ii) the one or more of ammonia or a water-soluble amine and (iii) water, the one or more of a copper ammine complex or a copper amine complex useful in connection with the inventive methods provide one or more copper-containing solid reaction products fixed within the cellulosic material when exposed to carbon dioxide or carbonic acid, as described further herein.

The one or more of a copper ammine complex or a copper amine complex used to prepare the treating composition may be provided by any known method. For example, the copper amine complexes include those prepared using at least one alkanolamine, e.g., ethanolamines (e.g., monoethanolamine, diethanolamine, triethanolamine) or propanolamines. Copper tetraammine carbonate, being a preferred copper ammine complex, is desirably prepared via any known method from copper sources such as basic copper carbonate, copper diammine carbonate, copper hydrate, or any other copper salt that is soluble in an ammonium hydroxide and ammonium carbonate mixture, which is desirably used.

When copper tetraamine carbonate is used to prepare the treating composition, as is preferred, the preferred copper source used to provide copper tetraamine in the aforementioned desirable reaction is cuprous oxide (Chem Copp HP, American Chemet Corp., Deerfield, IL). Cuprous oxide has a relatively high copper content (about 88% copper), and is available as a dry, fine powder of consistent high quality. That it is available in dry form serves to reduce shipping costs (as the reaction is desirably undertaken at the location of cellulose treatment), while its availability as a fine particulate has been found to aid reaction kinetics. This dry, fine copper-containing compound also provides for a reduced oxygen requirement during the reaction relative to other copper-containing compounds.

While any amount of the ammonium components may be used to provide for the desired yield of copper tetraammine carbonate (or used in the preparation of any other copper ammine complex), it is desirable to limit the total amount of ammonium components because it was found that the presence of residual ammonium adversely affects the subsequent conversion of copper tetraammine carbonate to the solid reaction product formed within the cellulosic material after exposure to carbon dioxide or carbonic acid, as described further herein. In this regard, the pH of the reaction solution may be used as a proxy for assessing the appropriate amount of ammonium to be used, with the pH of the reaction (at start and during the reaction) desirably ranging from about 7.5 to about 11.0, and more desirably from about 8.0 to about 10.0, and most desirably from about 8.5 to about 9.0, each of these ranges including increments of 0.1 pH.

The inventive methods permit the treating composition to be prepared at the location at which the cellulosic material will be treated. For example, cuprous oxide may be shipped as a solid, and converted to the desired complex for use in preparing the treating composition, while copper tetraamine carbonate may be shipped as a concentrated solution, with ammonia and/or water (or with other supplemental components, as described herein) added as needed at the location of use to provide the final treating composition.

The ability to prepare a treating composition on site, and as needed, has advantages over conventional treating methods. One commonly-used conventional method requires preparing and shipping ready-to-use slurries or dispersions of copper-containing solids (e.g., micronized particulate basic copper carbonate (BCC)) from the supplier to the cellulosic material processing facility. In contrast, the present invention provides for lower transportation costs (as the solid (or a concentrate) can be shipped as opposed to shipping of the final treating solution, reduced order lead time, relative ease of preparation, and flexibility in process scheduling as the treating composition may be prepared as needed on site. The present invention provides the foregoing advantages, while also permitting desired amounts of copper (and any other optional preservatives or supplemental components, including those described herein) to be introduced into the cellulosic material such that certain desired specifications are met, and the desired degree of preservation is achieved. These specifications, include, but are not limited to, leaching, retention, penetration, and preservation, as more fully described herein.

Those skilled in the art will appreciate that there may exist in the liquid treating composition relatively minor amounts of particulates (e.g., copper- and/or zinc-containing particulates) that are not in solution. It is believed that the presence of particulates, and particularly relatively coarse particulates containing copper and/or zinc, hinders the introduction of the treating composition into the cellulosic material, thereby adversely affecting penetration and, ultimately, preservation. One means of addressing this is to provide for an optional filtration step in connection with the preparation of the treating composition and/or prior to its introduction into the cellulosic material, to remove any undesired particulates. If present, such particulates are desirably no larger than about 1000 nm, more desirably no larger than about 500 nm and preferably no larger than about 200 nm (with lower particulate sizes being preferred for more refractory species), as measured using any appropriate conventional apparatus. The quantity of any such particulates that may be present in the composition (particularly copper-containing particulates, and, if present, zinc-containing particulates) is desirably limited to no more than about 0.0001, 0.001, 0.005, 0.01, 0.05, 0.1, 0.5, 1 or 2 wt. % of the treating composition or, alternatively, limited to about 0.0001 wt. % up to about 0.001, 0.005, 0.01, 0.05, 0.1, 0.5 or 1 wt. % of the treating composition.

The treating composition may be prepared by combining, desirably with agitation: (i) about 0.01 to about 10 wt. % copper ammine complex (desirably, copper tetraammine carbonate (CTC)) and/or copper amine complex, desirably from about 0.05 to about 5 wt. % copper ammine complex (desirably CTC) and/or copper amine complex, and preferably from about 0.1 to about 2 wt. % copper ammine complex (desirably CTC) and/or copper amine complex; (ii) about 0.02 to about 20 wt. % ammonia and/or a water soluble amine (desirably ammonia), more desirably from about 0.1 to about 10 wt. % ammonia and/or a water-soluble amine (desirably ammonia), and preferably from about 0.5 to about 5 wt. % ammonia and/or a water-soluble amine (desirably ammonia); and (iii) about 70 to about 99.9 wt. % water, desirably from about 85 to about 99.9 wt. % water, and preferably about 94 wt. % to about 99.9 wt. % water.

Preferably, the treating composition is prepared by combining, desirably with agitation, (i) about 0.01 to about 10 wt. %, from 0.05 wt. % to about 5 wt. % or from about 0.1 wt. % to about 2 wt. %, copper tetraammine carbonate (CTC); (ii) about 0.02 to about 20 wt. %, about 0.1 to about 10 wt. %, or about 0.5 wt. % to about 5 wt. % ammonia and/or monoethanolamine (desirably ammonia); and (iii) about 70 wt. % to about 99.9 wt. %, about 85 wt. % to about 99.9 wt. % or about 94 wt. % to about 99.9 wt. % water.

Optionally, but desirably, a zinc-containing component may be used to provide a treated cellulosic material via the inventive method. If desired, one or more of zinc ammine complex (desirably zinc tetraamine carbonate (ZTC)) or a zinc amine complex may be added to the treating composition prior to introducing the composition into the cellulosic material, with ZTC being preferred. Illustrative of zinc amine complexes suitable for use in the inventive methods include, but are not limited to, those prepared using at least one alkanolamine, e.g., ethanolamines (e.g., monoethanolamine, diethanolamine, triethanolamine) or propanolamines.

These zinc-containing components also will be solubilized in the ammonia and/or water-soluble amine and water composition. If present, the amount of zinc ammine complex and/or zinc amine complex introduced into the composition may vary depending on the amount of zinc one desires to be present in the resulting treated cellulosic material. Generally, however, zinc ammine complex (desirably zinc tetraamine carbonate) and/or zinc ammine complex may be introduced into what will become the treating composition in an amount ranging from about 0.02 wt. % to about 20 wt. %, more desirably from about 0.1 wt. % to about 10 wt. %, and preferably from about 0.2 wt. % to about 4 wt. %, based on the weight of the treating composition.

The invention also contemplates the optional, but desirable, inclusion of supplemental components in the liquid treating composition that may be delivered into the cellulosic material, and which augment the preservation of the treated cellulosic material. These supplemental components should be compatible with the solution (e.g., no precipitate formation, no undesired reaction with other components) and may further, but need not be, also in solution. Illustrative of categories of such supplemental components include, but are not limited to, insecticides, mold inhibitors, algaecides, bactericides, water repellants, colorants and corrosion inhibitors, with specific supplemental components including, but not limited to, azole derivatives such as cyproconazole, propiconazole, tebuconazole, Busan (TCMTB) 2-(thiocyanatomethylthio) benzothiazole; chlorothalonil; dichlofluanid; isothiazolones such as Kathan 930 (4,5-dichloro-2-n-octyl-3-(2H)-isothiazoline), Kathan WT (5-chloro-2-methyl-4-isothiazolin-3-one and 2-methyl-4-isothiazolin-3-one), methylisothiazolinone and benzisothiazolin-3-one 2-octyl-3-isothiazolone; imidacloprid; iodopropynyl butylcarbamate (IPBC); pyrethroids such as bifenthrin, cypermethrin and permethrin; chitin; chitosan; clorpyrifos; 4-cumylphenol; fipronil; carbendazim; cyfluthrin; petroleum waxes; sodium nitrite; boric acid; and metal oxides and dyes.

The invention advantageously permits a wide variety of cellulosic materials to be treated, including certain materials which are known to be resistant to conventional methods, or that are necessarily treated with undesirable chemicals, these materials including refractory hardwood and softwood species. While these cellulosic materials may vary by type and physical dimensions, they must be sufficiently porous to enable absorption of the treating solution therein to the extent required to provide the desired performance.

The species of cellulosic materials that may be treated in accordance with the invention include softwoods (refractory and non-refractory) and hardwoods, desirably after they are processed into dimensioned lumber, pilings, posts and poles, but also sawdust, woodchips and wood scraps of these woods. These materials may be treated and subsequently used in the manufacture of products therefrom, including, without limitation, particle board, parallel strand lumber, composite materials, such as wood plastic composites (WPC) used as decking material (wherein the treated cellulosic material, such as sawdust or wood chips, comprises at least a portion of the composite material), as well as laminated wood products such as plywood, laminated veneer lumber and laminated structural beams.

The treating composition may be introduced into the cellulosic material using a variety of methods, including, without limitation, spraying, bushing, rolling or immersion. Preferably, the introduction is accomplished by immersing the cellulosic material in the treating composition, wherein the cellulosic material remains immersed therein until the treating composition is absorbed and penetrates into the cellulosic material. While the degree of penetration is dependent, in part, on the type (species) of cellulose material, the length of time and conditions under which the treating composition remains in contact with the material, it is preferred that the time and conditions be sufficient to permit the treating composition to penetrate the particulate species of cellulosic material to the maximum extent possible, desirably impregnating the cellulosic material to be treated.

The amount of treating solution useful in the context of the invention will vary depending on the species, or type, of cellulosic material to be treated. Illustrative of cellulosic materials that may be treated in accordance with the inventive method include: southern pine, radiata pine, ponderosa pine, Douglas fir, Hem Fir, Jack pine, cedar, western pine, oak, redwood, hickory, beech, birch, maple, pacific fir, red pine, hemlock and spruce-pine-fir. For example, certain species of pine absorb liquids to a great extent, and thus a relatively significant amount of the treating composition will be required. In contrast, a species of softwood Douglas-fir, as well as Hem Fir and spruce-pine-fir, will require relatively less amount of treating composition, these species heretofore being relatively difficult to treat using conventional methods.

It is desirable from a commercial perspective that the introduction of the treating composition into the cellulosic material, and the exposure of that cellulosic material to carbon dioxide and/or carbonic acid, occur within the same vessel. This vessel may be of any suitable construction, but is desirably able to withstand pressurization and vacuum, for the reasons set forth in more detail herein.

In addition to the species and/or type of cellulosic material to be treated, and the composition of the treating solution, the conditions under which the inventive methods are undertaken may have an effect on the desired outcome, as further described herein.

After the treating composition has been introduced into the cellulosic material, the inventive methods contemplate exposing the combination of cellulosic material and treating composition to carbon dioxide and/or carbonic acid. While not desiring to be bound to a particular theory, it is believed that the carbon dioxide and/or carbonic acid penetrates into the cellulosic material, and reacts in situ with one or more of the copper-containing components present in the treating composition (and/or with any zinc-containing components, if used to prepare the composition), whereby the copper (and, if present, zinc) within the cellulosic material becomes fixed therein. It is believed that this fixation assists in minimizing the leaching of copper (and zinc, if present) from the treated cellulosic material, provides for enhanced copper (and zinc, if present) retention in the treated material, relative to conventional systems, thus allows certain desired specifications to be met, and the desired degree of preservation of the treated material to be achieved.

Generally, the inventive methods desirably contemplate charging the cellulose material to be treated into a vessel, introducing the treating composition into the vessel under conditions such that the cellulosic material absorbs a desired amount of the treating composition, draining excess treating composition from the vessel, and, after the excess composition is removed from the vessel, exposing the cellulose material to carbon dioxide or carbonic acid to provide the treated cellulosic material. For commercial purposes, it is contemplated that each step of the inventive methods be undertaken in a single vessel, although semi-batch processes also may be employed. It is also contemplated that the cellulosic material, after being treated with the treating composition, may be removed from the treatment vessel (so as to remove the cellulosic material from the treating composition) and placed into a second (different) vessel wherein the exposure step is conducted, although this process may not be desirable commercially due to efficiency concerns.

Various modifications may be made to the inventive methods. For example, after the cellulosic material is charged into the vessel, and prior to the introduction of the treating composition therein, a vacuum may be pulled within the vessel. It is believed that by applying this vacuum, void space may be maximized within the cellulosic material, thereby allowing more efficient and extensive penetration of the subsequently-introduced treating composition into the material. While the vacuum may vary depending upon the specific cellulosic material (with relatively greater vacuum and residence time desirably provided when greater penetration is desired), the vacuum applied may desirably be applied at about 1 to about 30 inches (in.) Hg, more desirably at about 5 to about 30 in. Hg, preferably at about 5 to about 20 in. Hg, and more preferably from about 10 to about 15 in, Hg, for a period of time ranging from about 1 to about 60 mins, desirably from about 5 to about 45 mins, preferably from about 10 to about 30 mins, and more preferably from about 10 to about 20 mins.

The vacuum and pressures associated with the inventive methods may be adjusted in intensity and duration in a variety of ways so as to employ treating cycles commonly referred to as full cell, modified full-cell, Lowry or Rueping cycles. Descriptions of these cycles may be found in the literature, e.g., AWPA Book of Standards (2015), which is incorporated herein by reference in its entirety.

In one aspect of the invention, the treating composition is introduced into the charged vessel, desirably while the vessel remains under vacuum (as described in a preceding section), wherein after the treating composition is introduced therein, the pressure in the vessel is increased to assist in introducing the composition into the cellulosic material. It has been found that by increasing the pressure, the liquid composition will penetrate the cellulosic material to a greater extent and in less time as compared to other methods in which there is an absence of pressure. The pressure increase may be accomplished via any suitable means, including via the introduction of air. While the pressure applied and residence time may vary depending on the relatively absorbency of the cellulose (material with relatively higher density requiring longer residence time and, if applied, relatively high pressure), it is desirable that the pressure and residence time be selected to provide for suitable penetration of the treating composition into the cellulose material. Generally, and if used, the pressure may range from about 1 to about 300 psig, more desirably from about 25 to about 250 psig, and most desirably from about 75 psig to about 200 psig, while the residence time of the material in the treating composition while under pressure desirably ranges from about 1 to about 600 mins, more desirably from about 2 to about 300 mins, preferably from about 3 to about 180 mins, more preferably from about 4 to about 60 minutes and even more preferably from about 5 to about 30 mins.

After the treating composition has been introduced into the cellulosic material, it is desirable to release any pressure that has been applied (e.g., over about 1 to about 30 mins, desirably from about 2 to about 20 mins, and more desirably from about 5 to about 10 mins), and drain the excess treating solution (the solution that has not been retained within the cellulosic material) from the vessel. Thereafter, the carbon dioxide and/or carbonic acid desirably may be introduced into the same vessel, and the vessel desirably pressurized to permit the carbon dioxide and/or carbonic acid to penetrate into the cellulosic material, thereby exposing the treating solution within the cellulosic material to the carbon dioxide and/or carbonic acid and causing the in situ reaction to occur. Pressurization may be provided via any suitable means, including, but not limited to, pressure pumps, the introduction of air and, desirably, via the introduction of carbon dioxide.

Desirably, after or during the removal of the treating composition, and prior to the introduction of the carbon dioxide and/or carbonic acid, a vacuum is pulled within the chamber. This vacuum is desirable, as it assists in the removal of any excess treating composition from the cellulosic material. It was found that any excess composition that remains as a pool on the exterior of the material, and which would be present during the exposure step, may result in undesired coloration (or discoloration) of the surface of the treated cellulosic material. Generally, and if used, the vacuum may range from about 1 to about 30 in. Hg, desirably from about 5 to about 29 in. Hg, more desirably from about 10 to about 28 in. Hg, and preferably from about 15 to about 27 in. Hg. The time during which the vacuum is applied also may vary, but desirably ranges from about 1 to about 60 mins, more desirably from about 5 to about 50 mins, preferably from about 10 to about 40 mins, and more preferably from about 20 to about 40 mins.

After the excess treating composition is drained from the vessel, it is desirable to recycle the composition. For example, after draining, the excess composition may be transported to a holding tank (desirably after filtration to remove any dirt or wood particles therein), wherein its composition may be adjusted if needed via the addition of one or more of copper tetraammine carbonate (or other copper ammine complex) or copper amine complex, ammonia and/or water-soluble amine and/or water to provide a replenished treating composition. Also, any copper-containing (or, if present, zinc-containing) particulates that may be present in the excess composition are desirably redissolved via this process (or, if not dissolved, filtered out of the composition). After this process is completed, the replenished treating composition may be used alone, or may be combined with fresh treating composition, for use in the inventive treating method.

When carbon dioxide is used, it may be introduced into the charged vessel by any suitable means. This introduction, and subsequent exposure to the treating composition entrained within the cellulose material, is desirably achieved after removal of the excess treating composition—and more desirably while the vessel is under vacuum (as described herein) by initially introducing carbon dioxide gas into the vessel and thereafter pressurizing the vessel for the desired time, at the desired pressure, as described herein. The exposure step also may be undertaken by introducing an aqueous composition, most preferably water alone, into the charged vessel after removal of the treating composition therefrom, with the subsequent introduction of carbon dioxide therein, preferably by bubbling the carbon dioxide through a diffuser, and thereby forming carbonic acid. The exposure step also may be undertaken in a vessel separate from the vessel used to introduce the treating composition into the cellulosic material.

The carbon dioxide or carbonic acid may be provided by any source, and further may be provided as part of the mixture of other gases or liquids. One example, exhaust from diesel or gasoline engines, which in addition to carbon monoxide contains carbon dioxide, advantageously may be used to provide at least some of the carbon dioxide required for the inventive method.

While the pressurization may vary during the carbon dioxide exposure step, it desirably may range from about 25 in. Hg vacuum to about 1, 10, 20, 30, 40 or 50 psig to about 200, 225, 250, 275, 300, 325 or 350 psig, including all ranges thereof, including from about 25 to about 275 psig, and from about 40 psig to about 250 psig, with this pressure being applied for a time sufficient to provide for the desired extent of treatment of the cellulosic material. When introducing carbon dioxide into the charged vessel (in the absence of any liquid therein), however, it is preferable for carbon dioxide to be provided at a relatively low pressure during the exposure step, such as between about 25 in. Hg vacuum to about 0, 1, 3 or 5 psig to about 10, 15, 20, 25 30, 35, 40, 45 or 50 psig, including all ranges thereof, as the use of these relatively low pressures has been found to minimize the amount of treating composition that will pool on the exterior surfaces of the cellulosic material during the exposure step (thus limiting the extent of undesired coloration of those exterior surfaces).

While the time of the exposure step may vary, and while a relatively shorter time is most efficient, the exposure time (during which carbon dioxide or carbonic acid is present) desirably may range from about 1, 5, 10, 15, 20, 25 or 30 mins to about 60, 70, 80, 90, 100, 110 or 120 mins, including all ranges therein, e.g., from about 1 to about 120 mins, and from about 5 to about 90 mins, and from about 10 to about 60 mins. An alternative is to charge the vessel with liquid carbonic acid, optionally followed by pressurization, as described above.

The amount of carbon dioxide and/or carbonic acid that may be used is that sufficient to provide for the desired amount of reaction product (which contains copper and zinc, if the latter was present in the treating composition) to be fixed in the cellulosic material after processing is completed (e.g., to provide for relatively low leaching and relatively high retention). In this regard, the carbon dioxide and/or carbonic acid desirably may be provided in excess relative to the amount of copper (or zinc) in the treating composition; if a carbonic acid solution is used, the solution may be saturated. It is believed that the reaction occurring in situ, within the cellulosic material, is self-limiting, thereby permitting the carbon dioxide and/or carbonic acid to be provided in excess.

The process also may be conducted at ambient temperatures, ranging from about 32° F. to about 110° F., and thus is energy efficient regardless of the geographic location/season in which the method is performed. The method is desirably performed at from about 35° F. to about 90° F., and more desirably at from about 40° F. to about 80° F.

After the exposure step is completed, it is desirable to release any pressure applied in a controlled manner, and preferably relatively slowly. It has been found that when the pressure is released slowly, liquid will be expelled from the cellulosic material. This assists in drying the cellulosic material, thereby reducing the amount of heat or time needed for the cellulosic material to reach its desired moisture content prior to use. Desirably, the pressure may be released relatively slowly for a first period of time, and then the rate of release may increase, e.g., 1-20 psi/min, more desirably from 5-15 psi/min, and most desirably 7-12 psi/min for at least the first 30 mins, desirably for the first 20 mins, and most desirably for the first 15 mins.

The inventive methods provide for desirable leaching and retention properties in the treated cellulosic material, which provide in part for desirable preservation of the cellulosic materials when exposed to the environment. These specifications, including, but not limited to, leaching, retention, penetration and preservation, are more fully described herein Other advantages provided by the inventive method include, but are not limited to: the absence of any noxious, toxic, odorous or undesirable compounds (e.g., sulfur, ammonia) that remain in the treated cellulosic material after treatment. For example, it was found that residual ammonia in the cellulosic material is neutralized by exposure to carbon dioxide, and therefore any potentially objectionable ammonia odor is reduced to a nearly non-detectable level (e.g., no more than about 30 ppm ammonia after 1 hour post-exposure step; from about 0, 1, 2, 3, 4 or 5 ppm to no more than about 20 ppm, about 15 ppm or about 10 ppm ammonia, at 4 days post-exposure). This exposure of cellulosic materials that have been treated using a composition containing ammonia or an amine to carbon dioxide, and the resulting subsequent reduction in ammonia odor, is believed to be applicable to any cellulosic treatment process that utilizes ammonia or an amine. Illustrative of systems in which ammonia odor control may be provided via exposure of the cellulosic material to carbon dioxide (desirably under pressure in a vessel, as described therein) after treatment with these systems include ACQ, ACZA, CA-B, CA-C, AAC, CX-A and KDS.

Another advantage provided by the inventive method is that the treating composition, when properly formulated, will not result in sludge formation on the surface of the cellulosic materials, particularly because the treating composition is provided as a solution (and is removed prior to the exposure step, and desirably after a vacuum has bene applied during and/or subsequent to such removal). In addition, the treated cellulosic material provided by the inventive method may be processed or coated using conventional materials and methods, e.g., kiln-dried, painted, stained or coated with a water-repellant composition. The inventive methods further provide treated cellulosic materials that meet or exceed the commercial performance standards (and applicable AWPA standards) met by conventional copper-treatment methodologies, such as alkaline copper quaternary (ACQ), ammoniacal copper zinc arsenate (ACZA), copper azole (CA-B), and micronized copper azole (MCA).

The amount of copper that remains in the cellulosic material after the inventive methods are conducted is desirably at least about 0.01, 0.02, 0.03, 0.04, 0.05, 0.06, 0.07, 0.08, 0.09 or 0.10 lbs/ft$^3$, with the upper limit of copper in the treated material varying, but desirably at no more than about 0.15, 0.2, 0.25, 0.3, 0.35, 0.4, 0.45, 0.5, 0.55, 0.6, 0.65, 0.7, 0.75, 0.8, 0.85, 0.9, 0.95 or 1 lbs/ft$^3$, and all combinations thereof, primarily due to cost. By way of example, the amount of copper that is generally acceptable in cellulosic material for above-ground use is 0.06 lbs/ft$^3$, and 0.15 lbs/ft$^3$ for ground contact. The copper content in the treated cellulosic material may be determined by procedures in the AWPA Book of Standards (2015), such as A9, A21 or A61, particularly when the cellulosic material is a dimensioned wood product.

The form of the copper (or copper-containing compound) that is fixed within the cellulosic material by the inventive methods may be characterized by any suitable analytical method. While understanding the precise physical form or chemical composition of the copper-containing compound (or zinc-containing compound, if used) that is fixed within the cellulosic material after execution of the inventive method is currently not believed to be critical to the advantages provided by the present invention, it is the characteristics of the treated cellulose relative to copper leaching, retention and penetration, as well as preservation of the treated cellulose material, and other advantages, as described herein, that are indicators of the value of the inventive methods to the industry.

Copper leaching from the treated cellulosic material also may be quantified, and may be evaluated by using E11 in the AWPA Book of Standards, particularly when the cellulosic material is a dimensioned wood product. Desirably, the inventive methods provide treated cellulosic material with at least the same as, and in certain cases superior to, anti-leaching properties provided by other copper treatments when evaluated using E11. For example, the inventive methods have been found to provide superior anti-leaching properties relative to conventional BCC micronized particle treatment with respect to interior surfaces (obtained by cross-sectioning) of treated cellulosic material. This is a significant advantage, as treated cellulosic material that is sectioned (e.g., treated wood that is cut during construction) will retain the desirable properties, e.g., anti-leaching, and thus retain its preservation qualities. It is desired that the percent copper leached as determined by AWPA Standard E11 (after a 24 h, 48 h, 3-day, 7-day and/or 14-day period) is less than about 25% of the total copper present in the treated cellulosic material (as described and assessed above), and more desirably less than about 20%, 15%, 10% or 5% thereof.

When present, the amount of zinc that remains in the cellulosic material after the inventive methods are conducted is desirably at least about 0.005 lbs/ft$^3$, more desirably at least about 0.02 lbs/ft$^3$, and most preferably at least about 0.04 lbs/ft$^3$. The upper limit of zinc in the treated material may vary, but is desirably no more than about 1 lbs/ft$^3$, more desirably no more than about 0.5 lbs/ft$^3$, and most preferably no more than about 0.15 lbs/ft$^3$, primarily due to cost. Methods for determining the amount of zinc therein are described in A9 and A21 in the AWPA Book of Standards.

Desirably, the inventive methods also provide treated cellulosic materials that exhibit resistance to insects (e.g., termites) and/or fungi. This resistance is thought to be imparted via the use of copper and zinc compounds and other biocidal compounds. The resistance to termites may be determined via method E1 in the AWPA Book of Standards, whereby less than 5% weight loss indicates acceptable termite resistance and/or a visual rating of at least 8, 9, 9.5 or 10. The resistance to fungi growth (e.g., using Postia placenta or other copper tolerant fungus) may be determined via method E11) in the AWPA Book of Standards, whereby less than 5% weight loss indicates acceptable resistance to fungi after 4-, 8- 12- and/or 16-weeks. The treated cellulosic provided by the inventive processes described herein desirably meet these standards for resistance. The following examples are illustrative of various aspects of the present invention, but should not be understood to limit the scope of the invention as described and claimed herein.

Example 1

Lab Scale Preparation of Copper Treating Composition 81 grams of finely milled cuprous oxide (Chem Copp HP) was added to 700 milliliters of water. The resulting slurry was subjected to continuous vigorous stirring, using a magnetic spin bar, at 280 rpm. 203 ml of commercially available technical grade ammonium hydroxide was added to the slurry. After the pH increased to 9.0, 88 grams of ammonium bicarbonate was then added to the slurry.

As the reaction proceeded, additional ammonium hydroxide was added on a periodic basis to maintain the pH of the reaction mixture at approximately 9.3 to 9.8. In this experiment, a total of 180 milliliters of additional ammonium hydroxide was added over the course of the reaction. The reaction mixture was aerated at all times using a ceramic air stone diffuser and a small air pump.

After one hour, a sample was drawn from the reaction vessel, and analyzed for copper content. It was found that the sample contained a dissolved copper content of 47 grams per liter.

After 4.5 hours, another sample was drawn from the reaction vessel, and analyzed for copper content. It was found that the sample contained 86 grams of copper per liter, and the final pH was 9.95. The composition was allowed to sit overnight in the reaction vessel (in the absence of stirring and aeration). A sample was drawn the next morning, and the final copper concentration in the sample was found to be 101 grams per liter, with a pH of 10.1.

The solution was used to successfully treat samples of Southern Pine.

Example 2

A series of experiments were undertaken to demonstrate the properties that may be obtained when using the inventive method. Unless otherwise indicated, the wood used in each of these experiments was Southern Pine. Also, and unless otherwise indicated, the percent copper provided is the weight percent copper as metal, and the copper ammine used to prepare the copper treating solutions (prepared in accordance with the description of the invention as provided herein) is copper tetraammine carbonate.

A. Series 1

Five sets of southern pine blocks were treated with various copper chemicals using vacuum and pressure impregnation procedures. Each set consisted of four 0.75 in. cubes and two 0.75×3.5×4 in. blocks.

It was found that a sample of Southern Pine (SP) blocks had an uptake of 38 pounds per cubic foot (pcf) of distilled water using conventional full cell treating cycles. To achieve an approximate 0.10 pcf of copper as metal in the SP blocks from various copper-containing solutions, it was determined that the solutions would have to contain 0.263% weight/weight (w/w) of copper.

The available copper tetraammine carbonate (CTC) solution contained 93 g/L (9.3%) of copper so it needed dilution to achieve 0.263% copper. 67.87 g of the concentrate solution was weighed into a gallon container. Water was added to achieve 2400 g total. Three 800 g aliquots of this solution were then used to treat 3 charges of blocks.

For Set 1 of the blocks, an 800 g aliquot of the above aqueous copper tetraammine carbonate solution that contained 0.263% copper as metal was used. The six blocks were placed in a small stainless steel pan and weighed down with lead weights. The 800 g of treating solution was poured over the blocks such that they were completely submerged. The pan and blocks were then placed in a small 8 in. diameter treating cylinder for typical full-cell treatment. The full-cell treatment began with a full vacuum (28 in. Hg) for 30 minutes. Then air pressure was applied up to 150 psig for 30 minutes. The cylinder was opened and the pan removed and the solution decanted. After returning the pan and blocks to the cylinder, a full vacuum was applied for 30 minutes. Then the pan and blocks were removed from the cylinder, the blocks removed from the pan and patted dry with a paper towel. The blocks were weighed to determine the retention. Weight pickups of treating solution ranged from 38.5 to 42.9 pound per cubic foot (pcf) and the average copper retention is set forth in Table 1.

For Set 2 of the blocks, another 800 g aliquot of the same 0.263% copper as metal solution as for the Set 1 blocks was used. The six blocks were placed in a small stainless steel pan and weighed down with lead weights. The 800 g of treating solution was poured over the blocks such that they were completely submerged. The pan and blocks were then placed in a small 8 in. diameter treating cylinder for treatment. The treatment began with a full vacuum (28 in. Hg) for 30 minutes. Then, air pressure was applied up to 150 psig for 30 minutes. The cylinder was opened and the pan and blocks removed and the solution decanted. After returning the pan and blocks to the cylinder, the blocks were exposed to 100-120 psig carbon dioxide gas for 30 minutes. Weight pickups of copper treating solution ranged from 18.9 to 27.7 pcf. The average copper retentions are set forth in Table 1.

For Set 3 of the blocks, a third 800 g aliquot of the same 0.263% copper as metal solution as for the Set 1 blocks was used. The six blocks were placed in a small stainless steel pan and weighed down with lead weights. Then, 800 g of treating solution was poured over the blocks such that they were completely submerged. The pan and blocks were placed in a small 8 in. diameter treating cylinder for treatment. The treatment began with a full vacuum (28 in. Hg) for 30 minutes. Then, air pressure was applied up to 150 psig for 30 minutes. The cylinder was opened and the pan and blocks removed and the solution decanted. After returning the pan and blocks to the cylinder, a 26-28 in. vacuum was exerted for 10 minutes, and then the cylinder was pressured to 100 psig carbon dioxide gas for 30 min. Weight pickups of treating solution ranged from 15.6 to 31.3 pcf. The average copper retentions are set forth in Table 1.

Set 4 of the blocks were exposed to the full-cell treatment as above with 800 g of Alkaline Copper Quaternary (ACQ-D) solution. The ACQ solution was made by adding 20.43 g of 10.3% of copper amine (CuMEA) produced from copper and mono-ethanolamine (or 2 amino ethanol) to a 1 L beaker. Then, 20.54 g of 50% dimethyldidecylammonium chloride (DDAC, Bardac 2250) was added, with water being added to bring the total to 800 g of ACQ-D. The ACQ solution used for treating contained 0.263% copper as metal. The same treating cycle as for Set 1 was used. Weight pickups were 34.8 to 41.7 pcf and the average copper retentions are set forth in Table 1.

Set 5 of the blocks were exposed to the full-cell treatment as above but with 800 g of a micronized copper dispersion similar to those commercially-available in makeup and size of copper particles. The micronized dispersion was made by adding 6.92 g of 30.4% copper as metal dispersion to a 1 L beaker. Then, water was added to bring the total to 800 g. The micronized dispersion used for treating contained 0.263% copper as metal. The same treating cycle used for Set 1 was used for this set of blocks. Weight pickups were 37.7 to 44.0 pcf. The average copper retentions are set forth in Table 1.

Within 2 hours of treatment, one of the larger blocks from each set was placed in 1000 ml of distilled water for leaching trials. The AWPA E11 protocol was used with aliquots being removed after 6, 24, 48, 96, 144, 192, 240, 288 and 336 hours. The water was changed at the above intervals as required in E11. The total amount of copper leached is set forth in Table 1.

TABLE 1

| Series 1 Results | | | |
|---|---|---|---|
| Set No. | Average Cu Retn, pcf | Penetration, % | Cu Leached, mg |
| 1 | 0.106 | 85 | 10.6 |
| 2 | 0.064 | 90 | 9.5 |
| 3 | 0.063 | 90 | 3.6 |
| 4 | 0.104 | 100 | 12.3 |
| 5 | 0.107 | 100 | 3.8 |

B. Series 2

This series expanded the proof of concept and built on the results of Set 3 above. Five sets of southern pine blocks were treated with various copper chemicals using vacuum and pressure impregnation procedures. Each set consisted of three 0.75 in. cubes and two 0.75×3.5×4 in. blocks.

For Set 6 of blocks an aqueous copper tetraammine carbonate solution was made that contained 0.263% copper as metal. The five blocks were placed in a container within a conventional treating cylinder. A 26-28 in. vacuum was exerted for 60 min., and then the cylinder was filled with carbon dioxide gas. The cylinder was opened and the container filled with the copper ammine solution so that the blocks were submerged in the solution. Then, the cylinder was pressurized to 150 psig for 70 min with carbon dioxide. After a slow pressure release, the cylinder was opened and the blocks removed. A thick blue "soup" had formed in the treating solution. Weight pickups of the blocks ranged from 37.7 to 43.6 pcf. The average copper retention is set forth in Table 2.

For the Set 7 blocks, the same 0.263% copper as metal solution used in Set 1 was used. The five blocks were placed in a container, covered with copper ammine solution, and placed in a conventional treating cylinder. A 26-28 in. vacuum was exerted for 60 min., and then the cylinder was opened and the solution was decanted. After the container and blocks were returned to the cylinder, another 26-28 in. vacuum was exerted for 30 min. and then the cylinder was pressurized to 120 psig for 30 min with carbon dioxide. Then, a 26-28 in. vacuum was exerted for 10 minutes and then the cylinder was pressured to 100 psig carbon dioxide gas for 30 min. After a slow pressure release, the cylinder was opened and the blocks removed. Weight pickups of treating solution ranged from 8.2 to 15.8 pcf. The average copper retention is set forth in Table 2.

For the Set 8 blocks, a high concentration of 5.0% copper as metal solution was used in order to prepare blocks for scanning electron microscope examination. The five blocks were placed in a container within a conventional treating cylinder. A 26-28 in. vacuum was exerted for 60 min. and then the cylinder was filled with carbon dioxide gas. The cylinder was opened and the container filled with the copper ammine solution (containing 5.0% copper as metal) so that the blocks were submerged in the solution. Then, the cylinder was pressurized to 150 psig for 60 min with carbon dioxide. After a slow pressure release, the cylinder was opened and the blocks removed. The wood was dark and had a heavy surface residue. Weight pickups of treating solution ranged from 34.5 to 43.8 pcf. The average copper retention is set forth in Table 2.

The Set 9 blocks were treated with 0.61% copper and a carbonic acid solution made by bubbling carbon dioxide gas through distilled water. The five blocks were placed in a container, with the container then being placed within a conventional treating cylinder. A 26-28 in. vacuum was exerted for 30 min., and then the cylinder was opened and the container filled with the copper ammine solution so that the blocks were submerged in the solution. A 26-28 in. vacuum was exerted for 10 min., and then the cylinder was pressurized to 150 psig with air for 15 min. After a slow pressure release, the cylinder was opened and the solution decanted. The blocks were then covered with the carbonic acid and the cylinder pressurized to 150 psig with air for 60 min. The blocks from Set 8 were also treated with the carbonic acid at the same time. Weight pickups of the Set 9 blocks ranged from 40.8 to 46.2 pcf. The average copper retention is set forth in Table 2.

The Set 10 blocks were treated with water only to verify the treatability of a new lot of southern pine.

Table 2 shows the wood retentions based on the average weight pickup, solution concentrations, and an assessment of the penetration.

Within 2 hours of treatment, one of the larger blocks from each set was placed in 1000 ml of distilled water for leaching trials. The AWPA E11 protocol was used with aliquots being removed after 6, 24, 48, 96 and 144 hours. It was found from Set 1 that only 2% additional copper was leached in each aliquot after 144 hours so this abbreviated schedule was used and the 336 hour amount estimated. The total amount of copper leached is shown in Table 2.

TABLE 2

| Series 2 Results | | | | |
|---|---|---|---|---|
| | Average Cu | | Cu Leached, mg | |
| Set No. | Retn, pcf | Penetration, % | 144 Hrs | 336 Hrs (Est.) |
| 6 | 0.110 | 85 | 2.8 | 2.9 |
| 7 | 0.033 | 10 | 1.8 | 1.9 |
| 8 | 1.95 | 100 | 1490 | 1550 |
| 9 | 0.052 | 100 | 6.3 | 6.8 |
| 10 | Water Only | — | — | |

C. Series 3

This series used three 0.75 in. cubes and two 0.75×3.5×4 in. blocks.

For Set 11 of the blocks, an empty cell treatment was used with an aqueous copper tetraammine carbonate solution that contained 0.263% copper as metal. The five blocks were placed in a container, which was then placed within a conventional treating cylinder. A 26-28 in. vacuum was exerted for 30 min., and then the cylinder was pressurized with carbon dioxide gas to 20 psig. After a slow release, the cylinder was opened and the container was filled with sufficient copper ammine solution so that the blocks were submerged in the solution. Then, the cylinder was pressurized to 150 psig for 15 min with air. After a slow pressure release, the cylinder was opened, the solution decanted, and then the cylinder was pressurized with carbon dioxide to 200 psig for 60 min. Weight pickups of copper solution ranged from 40.0 to 45.6 pcf.

For the Set 12 blocks, the same 0.263% copper as metal solution used for the Set 11 blocks was used. The five blocks were placed in a container, covered with carbonic acid solution, and then placed within a conventional treating cylinder. A 26-28 in. vacuum was exerted for 30 min. and then the cylinder was brought to atmospheric pressure with carbon dioxide gas. After a slow release, the cylinder was opened and the container filled with sufficient carbonic acid solution so that the blocks were submerged in the solution. Then, the cylinder was pressurized to 150 psig for 30 min with carbon dioxide. After a slow pressure release, the cylinder was opened and the solution decanted. The container was then filled with the copper ammine solution so that the blocks were submerged in the solution. Then, after placing the container into the cylinder, the cylinder was pressurized to 150 psig for 30 min with air. Weight pickup of copper solution ranged from 4.1-8.0 pcf.

For the blocks of Set 13, a modified full-cell cycle was used for the 0.263% copper ammine treatment. The container with five blocks was filled with a sufficient of the copper ammine solution so that the blocks were submerged in the solution. After placing the container and submerged blocks in the cylinder, a 15-18 in. vacuum was exerted for 30 min, and then the cylinder was pressured with air to 150 psig for 15 min. After a slow release, the solution was decanted and blocks weighed. Weight pickups of copper solution ranged from 29.3 to 32.7 pcf. Then, carbonic acid was added and the cylinder was pressurized with carbon dioxide to 165 psig for 30 min. A slow pressure release over an 8 min. period was used, the solution was then decanted, and the samples were reweighed.

For the blocks of Set 14, an empty cell cycle was used for the carbonic acid treatment. The container with five blocks was filled with a sufficient amount of the carbonic acid so that the blocks were submerged in the solution. After placing the container with the submerged blocks in the cylinder, the cylinder was pressured with carbon dioxide to 150 psig for 15 min. After a slow release (5 min.), the solution was decanted and blocks weighed. Then, the 0.263% copper ammine solution was added and cylinder pressurized with air to 165 psig for 30 min. A slow pressure release was used, and then the solution was decanted. The samples were reweighed and weight pickups of copper solution were found to range from 5.0 to 9.2 pcf.

For the Set 15 blocks, an empty cell treatment was used with aqueous copper tetraammine carbonate solution that contained 0.263% copper as metal. The five blocks were placed in a container, with the container and blocks being placed within a conventional treating cylinder. A 26-28 in. vacuum was exerted for 30 min., and then the cylinder was pressurized to atmospheric with carbon dioxide gas. After a slow release, the cylinder was opened and the container filled with the copper ammine solution so that the blocks were submerged in the solution. Then, the cylinder was pressurized to 150 psig for 15 min with air. After a slow pressure release, the cylinder was opened and the copper solution decanted. Weight pickups of copper solution ranged from 40.1 to 47.0 pcf. The container was then filled with carbonic acid and pressurized with carbon dioxide to 180 psig for 30 min.

Table 3 provides retention and penetration data. As before, within 2 hours of treatment, one of the larger blocks from each set was placed in 1000 ml of distilled water for leaching trials. As before, the AWPA E11 protocol was used up to 144 hours with the 336 hour amount estimated. The total amount of copper leached is shown in Table 3.

TABLE 3

Series 3 Results

| Set No. | Average Cu Retn, pcf | Penetration, % | Cu Leached, mg 144 Hrs | Cu Leached, mg 336 Hrs (Est.) |
|---|---|---|---|---|
| 11 | 0.113 | 100 | 3.2 | 3.5 |
| 12 | 0.016 | 20 | 4.9 | 5.3 |
| 13 | 0.083 | 100 | 3.8 | 4.1 |
| 14 | 0.019 | 50 | 2.9 | 3.2 |
| 15 | 0.116 | 100 | 7.9 | 8.5 |

D. Series 4

This series used two 0.75 in. cubes and two 0.75×3.5×4 in. blocks.

For the Set 16 blocks, a modified full cell cycle followed by a Lowry cycle was used. The four blocks were placed in a container, and the container and blocks were placed within a conventional treating cylinder. A 15-18 in. vacuum was exerted for 15 min, and then the container was filled with 0.53% copper ammine via a tube while the cylinder was under vacuum. After filling, the cylinder was pressured with air to 165 psig for 15 min. After a slow release, the solution was decanted and blocks weighed. Weight pickups of copper solution ranged from 20.9 to 25.0 pcf. Then, carbonic acid was added and cylinder pressurized with carbon dioxide to 180 psig for 30 min. A slow pressure release over 7-8 min. period was used, and the solution was then decanted and the blocks reweighed. This treatment cycle, identified herein as the MFC/Lowry cycle, was used in subsequent experiments, as further described herein.

The Set 17 blocks were treated with a double Lowry cycle. The four blocks were covered with 0.53% copper ammine and placed in a conventional treating cylinder. The cylinder was pressurized with air to 165 psig for 60 min. After a slow release, the solution was decanted and blocks weighed with weight pickups of copper solution ranging from 28.0 to 31.8 pcf. Then, the blocks were covered with carbonic acid and the cylinder pressurized with carbon dioxide to 180 psig for 60 min. A slow pressure release was used, and then the solution was decanted. The samples were reweighed.

The Set 18 blocks were also treated with a double Lowry cycle but in the reverse order of Set 17. The four blocks were covered with carbonic acid and placed in a conventional treating cylinder. The cylinder was pressurized with carbon dioxide to 180 psig for 30 min. After a slow release over a 5 min. period, the solution was decanted and the blocks were weighed. Then, the blocks were covered with 0.53% copper ammine and the cylinder pressurized with air to 165 psig for 60 min. A slow pressure release was used and then solution decanted. The samples were reweighed and the weight pickup of copper solution was found to range from 9.5 to 11.4 pcf.

A short full cell cycle followed by a Lowry cycle was used on the blocks of Set 19. The four blocks were placed in a container, with the container and blocks then being placed within a conventional treating cylinder. A 26-28 in. vacuum was exerted for 5 min, and then the container was filled with carbon dioxide gas to atmospheric pressure. The blocks were then covered with carbonic acid, and the cylinder pressurized with carbon dioxide to 70 psig for 5 min. After a slow pressure release, the carbonic acid was decanted and the wood weighed. The blocks were then covered with 0.53% copper ammine and the cylinder was pressurized to 165 psig for 60 min with air. The weight pickup of copper solution ranged from 1.2 to 2.6 pcf.

Table 4 sets forth retention and penetration data. As before, within 2 hours of treatment, one of the larger blocks from each set was leached for 144 hours with the 336 hour amount estimated. The total amount of copper leached is set forth in Table 4.

TABLE 4

| Series 4 Results | | | | |
|---|---|---|---|---|
| | Average Cu | | Cu Leached, mg | |
| Set No. | Retn, pcf | Penetration, % | 144 Hrs | 336 Hrs (Est.) |
| 16 | 0.118 | 100 | 4.9 | 5.3 |
| 17 | 0.158 | 75 | 4.7 | 5.1 |
| 18 | 0.054 | 75 | 4.2 | 4.5 |
| 19 | 0.010 | 20 | 3.7 | 4.0 |

E. Series 5 Leaching and Material Balance 1

This series of experiments were conducted to determine a material balance, and repeats some of the previous treatment methods. Two 0.75 in. cubes and four 0.75×3.5×4 in. blocks were used, for a total of 6 blocks.

For Set 20, a typical full cell cycle was used for a copper ammine (CTC) only treatment (repeat of Set 1). The six blocks were placed in a container, the container and blocks placed within a conventional treating cylinder, and then the blocks were covered with a 0.263% copper ammine (CTC) solution. The container was placed in the cylinder and a 26-28 in. vacuum was exerted for 60 min. A rapid release to atmospheric pressure was followed with pressurization with air to 165 psig for 30 min. After pressure release and decanting of the liquid, solution pickups of 44.3-52.8 pcf were determined. The average copper retentions are set forth in Table 5.

For Set 21, a typical full cell cycle was used for an ACQ treatment (repeat of Set 3). The six blocks were placed in a container, the container and blocks placed within a conventional treating cylinder, with the blocks being covered with ACQ solution containing 0.263% copper as metal. The container was placed in the cylinder and a 26-28 in. vacuum was exerted for 60 min. A rapid release to atmospheric pressure was completed, and then the cylinder was pressurized with air to 165 psig for 30 min. The solution was decanted, and the blocks were weighed. Weight pickups of 37.2 to 46.3 pcf were found.

For Set 22, a typical full cell cycle was used for a micronized copper (MCA) treatment (repeat of Set 5). The six blocks were placed in the container within a conventional treating cylinder, and covered with the micronized copper dispersion described above containing 0.263% copper as metal. The container, with the blocks in the dispersion, was placed in the cylinder and a 26-28 in. vacuum was exerted for 60 min. A rapid release to atmospheric pressure was undertaken, then the cylinder was pressurized with air to 165 psig for 30 min. The solution was decanted and the boards weighed. Weight pickups of 43.4 to 45.0 pcf were found.

The blocks for Set 23 were treated with a modified full cell cycle for copper ammine followed by a Lowry cycle for carbonic acid (Repeat of Set 16). This and similar dual treatments where the wood is first treated with a copper solution and then the copper fixed by carbon dioxide are referred to hereafter as 'Carbon Dioxide Fixation" or CDF. The six blocks were placed in the container within a conventional treating cylinder. A 15-18 in. vacuum was exerted for 15 min, and then the container was filled with 0.52% copper ammine via a tube while the cylinder was under vacuum. After filling, the cylinder was pressured with air to 165 psig for 15 min. After a slow release, the solution was decanted and blocks weighed. Weight pickups of copper solution ranged from 23.0 to 26.9 pcf. Then, the blocks were covered with carbonic acid and the cylinder pressurized with carbon dioxide to 180 psig for 30 min. A slow pressure release over 7-8 min. period was used, and then the solution was decanted. The samples were reweighed.

Table 5 sets forth retention and penetration data for Sets 20-23, but a slight change was made to the leaching procedure. One of the large blocks was split into four roughly 0.75×4 in. pieces to expose additional side grain without increasing the end grain. These four pieces were then leached using the same procedure as if they were an intact block. The abbreviated 144 hour schedule was used as before and the results are in Table 5.

TABLE 5

| Series 5 Leaching Results | | | | | |
|---|---|---|---|---|---|
| | | Average Cu | | Cu Leached, mg | |
| Set No. | System | Retn, pcf | Pen., % | 144 Hrs | 336 Hrs (Est.) |
| 20-Whole | CTC | 0.126 | 100 | 8.5 | 9.2 |
| 21-Whole | ACQ | 0.107 | 100 | 14.2 | 15.3 |
| 22-Whole | MCA | 0.117 | 100 | 8.2 | 8.8 |
| 23-Whole | CDF | 0.130 | 95 | 4.0 | 4.3 |
| 20-Split | CTC | 0.126 | 100 | 9.0 | 9.8 |
| 21-Split | AGO | 0.107 | 100 | 14.1 | 15.2 |
| 22-Split | MCA | 0.117 | 100 | 18.4 | 19.9 |
| 23-Split | CDF | 0.130 | 95 | 5.6 | 6.1 |

This series was very instructive in that it showed that cycles could be controlled so that the treatment methods in accordance with the inventive methods provide results that essentially match those exhibited by existing commercial products.

Furthermore, the leaching of wood treating in accordance with the inventive methods was found to be only about half that of wood treated using micronized copper when the blocks were whole, and only a third when the blocks were split. Presumably, splitting the micronized blocks opened pores where copper was readily available for leaching. Such splitting mimics various machining of wood at job sites.

Further work was done with the Series 5 blocks to determine the material balance. In this case, treatment weights had been determined and the blocks were then analyzed for copper at the Southern Pine Inspection Bureau (SPIB) and the total leachate measured. These quantities were used to calculate the material balance of copper and the results are in Table 6.

TABLE 6

| Material Balance 1 | | | | | | | | |
|---|---|---|---|---|---|---|---|---|
| Sample No. | System | Size | Leach | Treat Cu, mg | SPIB, mg | Leach Cu, mg | Leach, % | Recovery, % |
| 202 | CTC | 1 × 3.5 × 4 | N | 333.1 | 261.5 | — | | 79 |
| 203 | CTC | 1 × 3.5 × 4 | Y | 331.4 | 236.7 | 9.2 | 2.8 | 74 |
| 211 | ACQ | 1 × 3.5 × 4 | Y | 318.0 | 242.2 | 15.3 | 4.8 | 81 |

TABLE 6-continued

| Material Balance 1 | | | | | | | | |
|---|---|---|---|---|---|---|---|---|
| Sample No. | System | Size | Leach | Treat Cu, mg | SPIB, mg | Leach Cu, mg | Leach, % | Recovery, % |
| 214 | ACQ | 1 × 3.5 × 4 | N | 283.0 | 286.2 | — | | 101 |
| 221 | MCA | 1 × 3.5 × 4 | Y | 323.3 | 341.3 | 8.8 | 2.7 | 108 |
| 223 | MCA | 1 × 3.5 × 4 | N | 323.3 | 311.0 | — | | 96 |
| 231 | CDF | 1 × 3.5 × 4 | Y | 365.3 | 316.5 | 4.3 | 1.2 | 88 |
| 233 | CDF | 1 × 3.5 × 4 | N | 344.9 | 118.4 | — | | 34 |

Generally, the recoveries matched that seen in the literature, with 80-110% of the copper found based on the treatment weights. (The last sample (233 CDF) is an outlier with a very low SPIB analysis for reasons unknown and is only included for information.) It is also instructive that the leaching results show improvement when using the inventive treatment methods.

Series 6—Material Balance 2

This series compares the use of the inventive methods which also had tebuconazole (CDF-Type B or CDF-B) with copper azole treatments (CA-B), using four 0.75 in. cubes in each set.

For the blocks of Set 24, a typical full cell cycle was used for copper azole treatment to above ground (AG) retention. The four samples were placed in a container within a conventional treating cylinder, and covered with a copper azole (CA-B) solution that contained 0.15% copper. CA-B has a ratio of 96.1:3.9 of copper to tebuconazole. After the container was placed in the cylinder, a 26-28 in. vacuum was exerted for 60 min. A rapid release to atmospheric pressure was completed, and then the cylinder was pressurized with air to 165 psig for 30 min. The solution was decanted and the boards weighed. Weight pickup of 44.6 to 46.5 pcf was found. The average copper retentions are set forth in Table 7.

For Set 25, a typical full cell cycle was used for copper azole treatment to assess ground contact (GC) retention. The four samples were placed in the container within a conventional treating cylinder and covered with a copper azole solution that contained 0.375% copper. The container was then placed in the cylinder and a 26-28 in. vacuum was exerted for 60 min. A rapid release to atmospheric pressure was completed, and then the cylinder was pressurized with air to 165 psig for 30 min. The solution was decanted, and the blocks weighed, with weight pickups of 45.3 to 47.4 pcf being found.

The Set 26 blocks were treated with a modified full cell cycle for copper ammine-tebuconazole followed by a full vacuum and then a Lowry cycle for carbonic acid to yield blocks at above ground (AG) retention. The four samples blocks were placed in the container within a conventional treating cylinder. A 15 in. vacuum was exerted for 15 min, and then the container was filled with 0.30% copper ammine-tebuconazole via a tube while the cylinder was under vacuum. The copper ammine-tebuconazole solution was made to have the same ratio of 96.1:3.9 copper to tebuconazole as CA-B. After filling, the cylinder was pressured with air to 165 psig for 15 min. After a slow release, the solution was decanted and the maximum vacuum was exerted for 5 min. The blocks were then weighed. Weight pickups of copper solution ranged from 8.3 to 9.0 pcf. Then, the blocks were covered with carbonic acid and the cylinder pressurized with carbon dioxide to 180 psig for 30 min. A slow pressure release of 7 min. was used, and the solution was decanted. The samples were reweighed.

The Set 27 blocks were treated with a modified full cell cycle for copper ammine-tebuconazole followed by a full vacuum and then a Lowry cycle for carbonic acid to yield blocks at ground contact (GC) retention. The four samples blocks were placed in the container within a conventional treating cylinder. A 15 in. vacuum was exerted for 15 min, and then the container was filled with 0.75% copper ammine-tebuconazole via a tube while the cylinder was under vacuum. After filling, the cylinder was pressured with air to 165 psig for 15 min. After a slow release, the solution was decanted and the maximum vacuum exerted for 5 min. The blocks were then weighed. Weight pickups of copper solution ranged from 9.0 to 10.2 pcf. Then, the blocks were covered with carbonic acid and the cylinder pressurized with carbon dioxide to 180 psig for 30 min. A slow pressure release of 7 min. was completed, and then the solution was decanted. The samples were then reweighed.

Table 7 sets forth the retention and penetration data for the copper component (but recall that tebuconazole was also present). As before, within 2 hours of treatment, the full AWPA E11 leaching test was initiated with aliquots being removed up to 336 hours. That is, the water was changed at the intervals required in E11 (6, 24, 48, 96, 144, 192, 240, 288 and 336 hours) and the 144 hour results are also shown in Table 7 for comparison to previous tables. It can be seen that the bulk of the leaching occurs within the 144 hours, so the result at that time point provides a reasonable estimate of the leaching.

TABLE 7

| Series 6 Treating Results | | | | |
|---|---|---|---|---|
| | Average Cu | | Cu Leached, mg | |
| Set No. | Retn, pcf | Pen., % | 144 Hrs | 336 Hrs (Act.) |
| 24 CA-B | 0.069 | 100 | 5.3 | 5.8 |
| 25 CA-B | 0.173 | 100 | 30.6 | 31.9 |
| 26 CDF-B | 0.066 | 100 | 1.7 | 1.9 |
| 27 CDF-B | 0.191 | 100 | 1.9 | 2.3 |

This series showed that using the inventive treatment methods were not affected by tebuconazole, and that the treatment methods could be adjusted to produce treated wood suitable for both above ground and ground contact.

As before, material balances were determined by comparing the amounts of copper injected with those found by SPIB analysis or by leaching (Table 8). Recoveries are reasonable without any outliers, and the leaching results show significant improvement when the inventive treatment methods are used.

TABLE 8

| Material Balance 2 | | | | | | | | |
|---|---|---|---|---|---|---|---|---|
| Sample No. | System | Size | Leach | Treat Cu, mg | SPIB, mg | Leach Cu, mg | Leach, % | Recovery, % |
| 241-2 | CA-B AG | 0.75 | Y | 15.1 | 11.7 | 2.88 | 19.1 | 97 |
| 243-4 | CA-B AG | 0.75 | N | 15.3 | 13.5 | — | | 88 |
| 251-2 | CA-B GC | 0.75 | Y | 38.7 | 28.2 | 15.96 | 41.2 | 114 |
| 253-4 | CA-B GC | 0.75 | N | 37.8 | 30.0 | — | | 79 |
| 261-2 | CDF-B AG | 0.75 | Y | 15.3 | 17.8 | 0.96 | 6.3 | 123 |
| 263-4 | CDF-B AG | 0.75 | N | 14.3 | 14.9 | — | | 104 |
| 271-2 | CDF-B GC | 0.75 | Y | 42.2 | 37.6 | 1.15 | 2.7 | 92 |
| 273-4 | CDF-B GC | 0.75 | N | 42.2 | 31.3 | — | | 74 |

F. Series 6

This series explored variations in the inventive treatment methods by covering copper-treated blocks with cold water and then bubbling carbon dioxide through the water to form carbonic acid. The bubbling was done inside of the cylinder. This series used two 0.75 in. cubes and two 0.75×3.5×4 in. blocks. The blocks for Set 28 were covered with copper ammine containing 0.30% copper while the blocks for Set 29 were covered with copper ammine containing 0.75% copper. The same cycle was used for both sets. First, a 15 in. vacuum was exerted for 45 min and then the solution was decanted. A 28-30 in. vacuum was then exerted for 5 min., and then the samples were weighed. The blocks were then covered with cold water, a bubbler inserted into the water, and carbon dioxide was thereafter bubbled into the water for 20 min. This was followed by pressurizing the cylinder with carbon dioxide to 180 psig for 30 min. The Set 28 copper solution weight pickups ranged from 29.8 to 36.1 pcf, while the Set 29 weight pickups ranged from 26.8 to 35.4 pcf (Table 9).

Sets 30 and 31 were treated with duplicates of the copper portion used in the preceding two sets (Sets 28 and 29). After the short 5 min. vacuum, Sets 30 and 31 were pressed using the bubbler only to achieve 60 psig for 30 min. The copper pickups were from 13.5 to 40.9 for Set 30 and from 11.0 to 39.1 pcf for Set 31.

TABLE 9

| Series 6 Bubbler Results | | | | |
|---|---|---|---|---|
| | | Cu Leached, mg | | |
| Set No. | Average Cu Retn, pcf | 144 Hrs | 336 Hrs (Est.) | Cu Leach, % |
| 28 | 0.10 | 2.7 | 3.6 | 15 |
| 29 | 0.24 | 22.5 | 26.5 | 7 |
| 30 | 0.083 | 8.9 | 10.5 | 32 |
| 31 | 0.19 | 29.5 | 31.1 | 16 |

G. Series 7

Series 7 was completed to compare the coloration of blocks treated using the inventive methods with commercial treatments. Blocks 321-322 (0.75×3.5×4 in.) were full-cell treated with the micronized copper described above to achieve 0.060 pcf Cu retention, blocks 331-2 were full-cell treated with ACQ to achieve 0.087 pcf Cu retention (0.13 pcf total a.i.) and blocks 341-2 were treated with copper ammine and then carbonic acid to achieve 0.062 pcf Cu retention. The retentions are the intended (or listed) above ground retentions. The blocks prepared in accordance with the inventive methods were very near the color of the micronized blocks while the ACQ-treated blocks were much "greener". A commercial sample of wood treated with micronized copper was obtained, and block 341 compared favorably with the former's color. A simple (and non-scientific) visual survey concluded that most people could not distinguish the colorations.

H. Series 8

A number of samples were prepared for a variety of efficacy tests. The samples will be tested for E1 Termite, E10 Soil Block with E11 Leaching, E12 Corrosion and E20 Soil Leaching. Table 10 shows the relevant information for the E1 and E10 blocks (SP=Southern Pine; Gum=Sweet Gum (*Liquidambar styraciflua*)).

TABLE 10

| E1 and E10 Blocks Treatment | | | | |
|---|---|---|---|---|
| Block No. | System | Size | Species | Cu. Retn., pcf |
| A1-A24 | Water Control | 0.75 in. | SP | |
| A25-A50 | Water Control | 0.75 in. | Gum | |
| A51-A59 | Water Control | E1 | SP | |
| B1-B24 | Carrier Control | 0.75 in. | SP | |
| B25-B50 | Carrier Control | 0.75 in. | Gum | |
| B51-B59 | Carrier Control | E1 | SP | |
| C1-C24 | CA-B AG | 0.75 in. | SP | 0.064 |
| C25-50 | CA-B AG | 0.75 in. | Gum | 0.061 |
| C51-C59 | CA-B AG | E1 | SP | 0.057 |
| D1-D24 | CA-B GC | 0.75 in. | SP | 0.16 |
| D25-D50 | CA-B GC | 0.75 in. | Gum | 0.15 |
| D51-D59 | CA-B GC | E1 | SP | 0.15 |
| E1-E24 | CDF-B AG | 0.75 in. | SP | 0.061 |
| E25-E50 | CDF-B AG | 0.75 in. | Gum | 0.058 |
| E51-E59 | CDF-B AG | E1 | SP | 0.055 |
| F1-F24 | CDF-B GC | 0.75 in. | SP | 0.14 |
| F25-F50 | CDF-B GC | 0.75 in. | Gum | 0.15 |
| F51-F59 | CDF-B GC | E1 | SP | 0.14 |

Within each letter group, blocks 6-10, 16-20, 31-35 and 41-45 were leached immediately per E11 methods for a total of 336 hours, with the results set forth in Table 11.

TABLE 11

| E11 Leaching Results | | | | | |
|---|---|---|---|---|---|
| Sample No. | System | Species | Cu Total mg. | Cu Leached mg. | Leach, % |
| A6-A10 | Water | SP | 0.0 | 0.24 | — |
| A16-A20 | Water | SP | 0.0 | 0.24 | — |
| A31-A35 | Water | Gum | 0.0 | 0.19 | — |
| A41-45 | Water | Gum | 0.0 | 0.13 | — |
| B6-B10 | Carrier | SP | 0.0 | 0.81 | — |
| B16-B20 | Carrier | SP | 0.0 | 0.78 | — |
| B31-B35 | Carrier | Gum | 0.0 | 0.53 | — |
| B41-B45 | Carrier | Gum | 0.0 | 0.61 | — |
| C6-C10 | CA-B AG | SP | 34.9 | 11.06 | 31.7 |
| C16-C20 | CA-B AG | SP | 36.3 | 11.22 | 30.9 |
| C31-C35 | CA-B AG | Gum | 32.6 | 14.11 | 43.3 |

TABLE 11-continued

| E11 Leaching Results | | | | | |
|---|---|---|---|---|---|
| Sample No. | System | Species | Cu Total mg. | Cu Leached mg. | Leach, % |
| C41-C45 | CA-B AG | Gum | 33.2 | 14.41 | 43.4 |
| D6-D10 | CA-B GC | SP | 92.5 | 51.5 | 55.7 |
| D16-D20 | CA-B GC | SP | 89.4 | 58.2 | 65.1 |
| D31-D35 | CA-B GC | Gum | 81.6 | 63.1 | 77.3 |
| D41-D45 | CA-B GC | Gum | 83.5 | 70.8 | 84.8 |
| E6-E10 | CDF-B AG | SP | 37.8 | 5.76 | 15.2 |
| E16-E20 | CDF-B AG | SP | 39.8 | 4.69 | 11.8 |
| E31-E35 | CDF-B AG | Gum | 42.1 | 8.97 | 21.3 |
| E41-E45 | CDF-B AG | Gum | 40.8 | 6.07 | 14.9 |
| F6-F10 | CDF-B GC | SP | 36.5 | 8.47 | 23.2 |
| F16-F20 | CDF-B GC | SP | 36.2 | 8.65 | 23.9 |
| F31-F35 | CDF-B GC | Gum | 42.6 | 12.45 | 29.2 |
| F41-F45 | CDF-B GC | Gum | 41.6 | 11.62 | 27.9 |
| Literature | CA-B | SP | — | — | 11.5 |
| Literature | MCA-B | SP | — | — | 4.4 |

Generally, the leaching attributable to samples prepared using the inventive methods amounted to about half of that for the control CA-B, which is generally consistent with literature values reported for CA-B and MCA. Freeman, M. H. and C. R. McIntyre, 2008, “A Comprehensive Review of Copper Based Wood Preservatives with a Focus on New Micronized or Dispersed Copper Systems,” Forest Products J., 58(11): 6-27. The losses in the foregoing experiments are relatively higher across the board because the leaching was initiated within two hours of the treatment, while the literature values are reported after the blocks age for two days.

E1 Termite testing was conducted on the 51-55 numbered blocks within each letter group. The results are set forth in Table 12.

TABLE 12

| E1 Termite Test Results Summary Table | | |
|---|---|---|
| Treatment | Mortality (%) | LSD Group |
| A. Water Control | 14.05% | A |
| B. Water-carrier control | 17.90% | A |
| C. CA-B (amine) 0.06 AG | 51.15% | B |
| D. CA-B (amine) 0.15 GC | 68.50% | C |
| E. CDF-B - Exp. 1 0.06 AG | 100.00% | D |
| F. CDF-B - Exp. 1 0.15 GC | 100.00% | D |
| Treatment | Weight Loss (%) | LSD Group |
| A. Water Control | 28.44 | A |
| B. Water-carrier control | 18.45 | B |
| C. CA-B (amine) 0.06 AG | 4.32 | C |
| D. CA-B (amine) 0.15 GC | 0.81 | C |
| E. CDF-B- Exp. 1 0.06 AG | 0.33 | C |
| F. CDF-B - Exp. 1 0.15 GC | 0.21 | C |
| Treatment | Rating | LSD Group |
| A. Water Control | 0.4 | A |
| B. Water-carrier control | 5.4 | B |
| C. CA-B (amine) 0.06 AG | 9.4 | C |
| D. CA-B (amine) 0.15 GC | 9.8 | C |
| E. CDF-B - Exp. 1 0.06 AG | 10 | C |
| F. CDF-B- Exp. 1 0.15 GC | 10 | C |

LSD groups with the same letter are not statistically different from each other. The samples treated in accordance with the inventive method (or CDF samples) demonstrated good efficacy and generally matched that of the CA-B controls. The carrier used did not influence the results.

Additional treating was done for the E12 testing using the treating methods described above wherein the wood is first treated with the copper solution and then exposed to carbon dioxide or carbonic acid. Each system was treated in four charges with twenty-five 0.75×1.5×3.75 in. blocks per charge for a total of 100 blocks per system. The treating results are set forth in Table 13.

TABLE 13

| E12 Block Treatments | | | | | | |
|---|---|---|---|---|---|---|
| | | SOLUTION, pcf | | | | |
| CHARGE | SYSTEM | AVERAGE | SD | MINIMUM | MAXIMUM | COV |
| 1 | ACQ | 41.47 | 2.20 | 37.67 | 45.40 | 5.31% |
| 2 | ACQ | 42.42 | 1.70 | 38.77 | 45.92 | 4.00% |
| 3 | ACQ | 41.92 | 2.47 | 37.85 | 45.83 | 5.89% |
| 4 | ACQ | 42.79 | 2.17 | 37.98 | 46.13 | 5.07% |
| | AVERAGE | 42.15 | 2.13 | 38.07 | 45.82 | 5.06% |
| 5 | CDF AG | 47.91 | 1.98 | 43.83 | 51.89 | 4.13% |
| 6 | CDF AG | 47.51 | 1.34 | 44.78 | 50.15 | 2.81% |
| 7 | CDF AG | 47.65 | 1.71 | 44.82 | 50.58 | 3.60% |
| 8 | CDF AG | 47.44 | 2.17 | 43.71 | 50.83 | 4.58% |
| | AVERAGE | 47.63 | 1.80 | 44.29 | 50.86 | 3.78% |
| 9 | CDF GC | 44.65 | 2.13 | 41.62 | 48.15 | 4.77% |
| 10 | CDF GC | 44.96 | 2.32 | 41.64 | 48.40 | 5.17% |
| 11 | CDFGC | 44.74 | 2.07 | 41.88 | 48.19 | 4.64% |
| 12 | CDF GC | 44.34 | 1.91 | 41.64 | 48.03 | 4.31% |
| | AVERAGE | 44.67 | 2.11 | 41.70 | 48.19 | 4.72% |
| 13 | WATER | 40.64 | 1.46 | 37.59 | 43.24 | 3.59% |
| 14 | WATER | 41.47 | 1.75 | 37.80 | 43.75 | 4.23% |
| 15 | WATER | 40.25 | 1.60 | 37.62 | 43.57 | 3.98% |
| 16 | WATER | 40.43 | 1.92 | 37.65 | 43.67 | 4.75% |
| | AVERAGE | 40.70 | 1.68 | 37.67 | 43.56 | 4.14% |

The respective treating targets and solution concentrations are set forth in Table 14.

TABLE 14

| E12 Target Retentions and Treating Solutions | | | |
|---|---|---|---|
| Sample | System | Pcf | Treat Soln., pcf |
| 01-100 | ACQ-D | 0.4 | 1 |
| 101-200 | CDF | 0.06 | 0.3 |
| 201-300 | CDF | 0.15 | 0.75 |
| 301-400 | WATER CONTROLS | 0 | 0 |

I. Treatment of Western Species

Samples of Hem Fir (HF) and Douglas fir (DF) were obtained that were still surface green. These were treated with heated solutions in the following regimes.

Samples 1-8 of 0.75×1.5×3.5 of Douglas fir and samples 9-16 of Hem Fir of the same size were treated with 0.3% copper solution using the MFC/Lowry cycle of Series 16/23 except the copper solution was heated to 120° F., initial vacuum was 15-18 in. for 60 min. and press was 120 min. The eight samples of Douglas fir averaged 38.7 pcf of solution pickup for 0.12 pcf Cu and the eight samples of Hem Fir averaged 51.5 pcf solution and 0.15 pcf Cu.

Since the above treatability study with small samples was favorable, above ground treatment (0.30% Cu) using the above cycle was done on 4 inch samples for later leaching testing as shown in Table 15. Ground contact treatment of some samples was also desired so a 0.75% Cu solution was used with the above cycle and then leached as in Table 15.

TABLE 15

| Western Species Above Ground Leaching Results | | | | | |
|---|---|---|---|---|---|
| Sample No | Size | Species | System | Total Cu, mg | Leach, mg |
| 5A | 1.5 × 3.5 × 4 | DF | CTC | | 32 |
| 5B | 1.5 × 3.5 × 4 | DF | CDF-AG | | 16 |
| 6A | 1.5 × 3.5 × 4 | DF | CTC | | 25 |
| 6B | 1.5 × 3.5 × 4 | DF | CDF-AG | | 8 |
| 13A | 1.5 × 3.5 × 4 | HF | CTC | | 61 |
| 13B | 1.5 × 3.5 × 4 | HF | CDF-AG | | 84 |
| 15A | 1.5 × 3.5 × 4 | HF | CTC | | 67 |
| 15B | 1.5 × 3.5 × 4 | HF | CDF-AG | | 20 |
| 1C | 1.5 × 3.5 × 4 | DF | CTC | 124 | 66 |
| 1D | 1.5 × 3.5 × 4 | DF | CDF-GC | 122 | 37 |
| 6C | 1.5 × 3.5 × 4 | DF | CTC | 112 | 63 |
| 6D | 1.5 × 3.5 × 4 | DF | CDF-GC | 111 | 29 |
| 13C | 1.5 × 3.5 × 4 | HF | CTC | 151 | 188 |
| 13D | 1.5 × 3.5 × 4 | HF | CDF-GC | 158 | 174 |
| 15C | 1.5 × 3.5 × 4 | HF | CTC | 142 | 138 |
| 15D | 1.5 × 3.5 × 4 | HF | CDF-GC | 132 | 94 |

Generally, the Douglas fir results show good improvement, with DF treated in accordance with the inventive methods exhibiting about half of the leaching relative to the control. The Hem Fir results are variable in that Sample board 13 did not appear to have been provided any benefit, while Sample board 15 was provided with a benefit.

J. 600 Series

This series scaled the Western Species to 12 inch samples which were treated full-cell with CTC solution of 0.30% copper as metal heated to 125° F. A maximum vacuum was pulled for 1 hour, and then a 2 hour press at 150 psig was done (Table 16). Poor solution retentions were obtained.

TABLE 16

| Western Species Larger Sample Above Ground Treatment | | | | |
|---|---|---|---|---|
| Sample No | Species | Incised | Size | Solution, pcf |
| 2 | DF | N | 1.5 × 3.5 × 12 | 10.7 |
| 3 | DF | N | 1.5 × 3.5 × 12 | 4.6 |
| 7 | DF | N | 1.5 × 3.5 × 12 | 9.5 |
| 17 | DF | Y | 1.5 × 5.5 × 12 | 14.6 |
| 18 | DF | Y | 1.5 × 5.5 × 12 | 20.7 |
| 19 | DF | Y | 1.5 × 5.5 × 12 | 19.4 |
| 9 | HF | N | 1.5 × 3.5 × 12 | 22.6 |
| 14 | HF | N | 1.5 × 3.5 × 12 | 9.5 |
| 16 | HF | N | 1.5 × 3.5 × 12 | 11.5 |

K. 700 Series

A 0.15% copper solution was used for Western Species (Table 17) using the same methodology described in the 600 Series to achieve ground contact. Poor solution retentions were observed.

TABLE 17

| Western Species Larger Sample Ground Contact Treatment | | | | |
|---|---|---|---|---|
| Sample No | Species | Incised | Size | Solution, pcf |
| 4 | DF | N | 1.5 × 3.5 × 12 | 7.1 |
| 8 | DF | N | 1.5 × 3.5 × 12 | 10.0 |
| 20 | DF | Y | 1.5 × 5.5 × 12 | 15.6 |
| 21 | DF | Y | 1.5 × 5.5 × 12 | 16.8 |
| 22 | DF | Y | 1.5 × 5.5 × 12 | 13.5 |
| 10 | HF | N | 1.5 × 3.5 × 12 | 23.4 |
| 11 | HF | N | 1.5 × 3.5 × 12 | 15.0 |

A one-inch section of the above samples was dried 24 hours at 105° C. to determine moisture as received (Table 18). Generally, the unincised Douglas fir and Hem Fir was at acceptable moisture contents, while the incised Douglas fir was wet.

TABLE 18

| Moisture Content of Western Species | | | | | | |
|---|---|---|---|---|---|---|
| Sample No | Species | Incised | Size | Initial | After | MC |
| 4 | DF | N | 1.5 × 3.5 × 1 | 34.76 | 30.36 | 14% |
| 8 | DF | N | 1.5 × 3.5 × 1 | 54.47 | 44.13 | 23% |
| 20 | DF | Y | 1.5 × 5.5 × 1 | 74.89 | 56.04 | 34% |
| 21 | DF | Y | 1.5 × 5.5 × 1 | 78.76 | 56.26 | 40% |
| 22 | DF | Y | 1.5 × 5.5 × 1 | 72.68 | 58.22 | 25% |
| 10 | HF | N | 1.5 × 3.5 × 1 | 33.33 | 28.63 | 16% |
| 11 | HF | N | 1.5 × 3.5 × 1 | 33.72 | 29.63 | 14% |

Also, a moisture meter was used to determine moisture content, with the incised DF being very green as shown in Table 19. There was good agreement between the meter and the OD measurements.

TABLE 19

| Moisture Meter Readings of Western Species | | | | | | | |
|---|---|---|---|---|---|---|---|
| Sample No | Species | Incised | Size | Initial, g | After, g | MC | METER |
| 2 | DF | N | 1.5 × 3.5 × 1 | 35.27 | 30.46 | 16% | 18.1 |
| 3 | DF | N | 1.5 × 3.5 × 1 | 36.34 | 31.70 | 15% | 19.0 |
| 7 | DF | N | 1.5 × 3.5 × 1 | 40.14 | 34.92 | 15% | 17.6 |
| 17 | DF | Y | 1.5 × 5.5 × 1 | 72.35 | 56.76 | 27% | Wet |
| 18 | DF | Y | 1.5 × 5.5 × 1 | 83.28 | 63.08 | 32% | Wet |
| 19 | DF | Y | 1.5 × 5.5 × 1 | 88.04 | 64.43 | 37% | Wet |

TABLE 19-continued

| Moisture Meter Readings of Western Species | | | | | | | |
|---|---|---|---|---|---|---|---|
| Sample No | Species | In-cised | Size | Initial, g | After, g | MC | METER |
| 9 | HF | N | 1.5 × 3.5 × 1 | 30.83 | 26.17 | 18% | 18.6 |
| 14 | HF | N | 1.5 × 3.5 × 1 | 33.83 | 29.42 | 15% | 18.1 |
| 16 | HF | N | 1.5 × 3.5 × 1 | 34.92 | 30.31 | 15% | 17.2 |

L. 800 Series Treatability of SP

This was a Southern Pine treatability study for new batch of wood with full vacuum for 60 min and then 30 min press at 165 psig with 0.15% Cu. SP Blocks were 0.75×3.5×4 100% sapwood (Table 20). The weight gains showed good treatability.

TABLE 20

| Treatability of SP Batch | | | | |
|---|---|---|---|---|
| Sample No. | Initial | Final | Pickup | Weight Gain |
| 1-1 | 102.11 | 217.62 | 115.51 | 113% |
| 1-2 | 105.04 | 176.03 | 70.99 | 68% |
| 1-3 | 102.49 | 223.00 | 120.51 | 118% |
| 2-1 | 123.95 | 235.30 | 111.35 | 90% |
| 2-2 | 124.09 | 203.02 | 78.93 | 64% |
| 2-3 | 124.08 | 232.82 | 108.74 | 88% |
| 3-1 | 103.37 | 216.51 | 113.14 | 109% |
| 3-2 | 104.68 | 217.47 | 112.79 | 108% |
| 3-3 | 106.38 | 212.58 | 106.2 | 100% |
| 4-1 | 111.48 | 226.73 | 115.25 | 103% |
| 4-2 | 111.55 | 226.94 | 115.39 | 103% |
| 4-3 | 110.77 | 225.08 | 114.31 | 103% |
| 5-1 | 128.29 | 236.93 | 108.64 | 85% |
| 5-2 | 128.14 | 236.35 | 108.21 | 84% |
| 5-3 | 128.51 | 234.85 | 106.34 | 83% |
| 6-1 | 111.04 | 206.39 | 95.35 | 86% |
| 6-2 | 113.17 | 191.31 | 78.14 | 69% |
| 6-3 | 113.52 | 230.36 | 116.84 | 103% |
| 7-1 | 107.40 | 220.89 | 113.49 | 106% |
| 7-2 | 107.75 | 225.45 | 117.7 | 109% |
| 7-3 | 108.69 | 197.02 | 88.33 | 81% |
| 8-1 | 103.81 | 218.92 | 115.11 | 111% |
| 8-2 | 104.33 | 223.34 | 119.01 | 114% |
| 8-3 | 103.17 | 222.04 | 118.87 | 115% |

M. 900 Series Repeatability Treatments

This series used the MFC/Lowry cycle of Series 16/23 (i.e. CDF processing) to do repetitive treatments using 0.30% copper on 0.75×3.5×4.0 inch SP (Table 21). The MFC/Lowry cycle consists of filling the cylinder with the copper solution and pulling a 15 inch vacuum for 15 minutes. Then, pressure exerted to 165 psig for 15 minutes using compressed air was applied, followed by a slow pressure release. The copper solution is removed and a full vacuum (~30 in. Hg) was pulled for 15 minutes. The drippage is removed and cylinder was filled with carbonic acid. Then, pressure of 180 psig is exerted with carbon dioxide for 30 minutes. After, there was a slow pressure release and carbonic acid was removed.

TABLE 21

| Repeatability Treatments | | | | | | | |
|---|---|---|---|---|---|---|---|
| 900 Series | | Initial | After Cu | After Vac | Cu, pcf | After CA | CA, pcf |
| 901 | 1-4 | 102.26 | 172.11 | 153.11 | 0.055 | 191.63 | 14.0 |
| | 2-4 | 122.56 | 191.06 | 171.12 | 0.053 | 203.41 | 11.7 |
| | 3-4 | 105.96 | 174.99 | 156.00 | 0.054 | 182.45 | 9.6 |
| 902 | 1-5 | 100.30 | 169.25 | 153.30 | 0.058 | 189.70 | 13.2 |
| | 2-5 | 125.40 | 194.86 | 177.40 | 0.057 | 204.88 | 10.0 |
| | 3-6 | 113.33 | 184.98 | 164.01 | 0.055 | 195.43 | 11.4 |
| 903 | 1-6 | 99.40 | 167.24 | 150.11 | 0.055 | 190.62 | 14.7 |
| | 4-4 | 111.75 | 181.98 | 163.20 | 0.056 | 189.67 | 9.6 |
| | 5-4 | 129.61 | 201.20 | 170.04 | 0.044 | 202.91 | 11.9 |
| 904 | 2-6 | 124.64 | 200.06 | 174.02 | 0.054 | 208.24 | 12.4 |
| | 3-5 | 105.36 | 169.18 | 151.22 | 0.050 | 187.30 | 13.1 |
| | 4-5 | 113.62 | 183.92 | 161.08 | 0.052 | 195.33 | 12.4 |
| 905 | 4-6 | 113.33 | 183.88 | 161.99 | 0.053 | 196.33 | 12.4 |
| | 5-5 | 127.35 | 191.02 | 174.22 | 0.051 | 202.60 | 10.3 |
| | 6-4 | 121.11 | 184.26 | 163.21 | 0.046 | 186.50 | 8.4 |
| 906 | 5-6 | 126.60 | 197.00 | 177.09 | 0.055 | 204.82 | 10.1 |
| | 6-5 | 113.81 | 180.26 | 164.28 | 0.055 | 190.96 | 9.7 |
| | 7-4 | 108.61 | 179.26 | 157.11 | 0.053 | 188.11 | 11.2 |
| 907 | 6-6 | 114.87 | 186.41 | 170.68 | 0.061 | 196.54 | 9.4 |
| | 7-5 | 110.22 | 179.24 | 159.02 | 0.053 | 189.45 | 11.0 |
| | 8-4 | 103.15 | 173.99 | 152.11 | 0.053 | 185.77 | 12.2 |
| 908 | 7-6 | 105.63 | 170.14 | 154.27 | 0.053 | 87.24 | 12.0 |
| | 8-5 | 104.91 | 171.11 | 153.11 | 0.052 | 184.11 | 11.2 |
| | 8-6 | 104.84 | 181.04 | 153.98 | 0.053 | 185.73 | 11.5 |

| AVERAGE VALUES PER CHARGE | | |
|---|---|---|
| | Cu, pcf | CA, pcf |
| 901 | 0.054 | 11.8 |
| 902 | 0.056 | 11.5 |
| 903 | 0.052 | 12.1 |
| 904 | 0.052 | 12.6 |
| 905 | 0.052 | 11.7 |
| 906 | 0.054 | 10.3 |
| 907 | 0.056 | 10.9 |
| 908 | 0.053 | 11.6 |

The average values per charge demonstrated good repeatability for the inventive methods. The copper retentions varied from 0.052 to 0.056 pcf Cu for the eight charges while the subsequent carbonic acid ranged from 10.3 to 12.6 pcf.

Example 3

Various aspects of the invention were further undertaken in a pilot plant facility using full-size Southern Pine lumber.

The treating cylinder was 18 inches in diameter and 8.5 feet long. A Rueping tank that was 18 inches in diameter and 8 feet in length was also available. The work tanks for the CTC solution and the carbonic acid solution were both 200 gallon polyethylene tanks. An appropriate vacuum pump was available. Pressure for the CTC treatment was done with an air compressor capable of 150 psig while compressed gas cylinders of carbon dioxide were used for the various pressures needed for that portion of the treatment. Carbonic acid was made on-site by bubbling carbon dioxide gas through cold water and monitoring the pH. Representative experiments using this equipment and materials follow.

To demonstrate the effectiveness of the process, the leaching values were determined for two groups of boards, with one half of the boards being treated with CTC alone and the other half of the boards (end-matched) being treated after the CTC with either carbon dioxide gas or carbonic acid. To provide the two groups of boards, four 2"×4"×8" boards were cut in half, with one half labeled as "A" and one half labeled as "B". All boards were treated with 0.30% CTC in the same charge using a Modified Full-Cell cycle to achieve a final 14.6 pcf solution retention. Later assays showed the wood to average 0.066 pcf copper retention. The cycle was 10 in. Hg for 15 minutes and then filling the cylinder with CTC while under vacuum. The cylinder was then pressurized to 140 psig and a gross retention of 38.6 pcf was obtained. The pressure was released and the cylinder emptied of solution. A final vacuum of 22 in. Hg was pulled for 10 minutes to achieve the final 14.6 pcf solution retention. All boards were weighed and the "A" boards were then removed from the cylinder. Two of the "B" boards were fixed using carbon dioxide gas at 165 psig for 40 minutes and the cylinder emptied. The remaining two "B" boards were then placed in the cylinder and treated with carbonic acid. For the carbonic acid treatment, the cylinder was placed under 15 in. Hg vacuum and the cylinder filled with carbonic acid under vacuum. Once full, the cylinder was pressurized with carbon dioxide gas at 165 psig for 40 minutes and then a slow pressure release was used. The cylinder was emptied.

A one-inch piece (2"×4"×1") from the center of each board was cut approximately two hours after the board was removed from the cylinder and the one-inch piece placed in 300 ml of distilled water. After 24 hours, the water was analyzed to determine the amount of leached copper. The CTC only boards leached 1.9 times the amount of copper relative to the boards that were further treated with carbonic acid, and 3.7 times the amount of copper relative to the boards that were treated with carbon dioxide. Thus, the fixation procedures (the subsequent treatment using carbonic acid and carbonic dioxide) resulted in significantly less copper leaching than from CTC treated boards.

Another experiment was done using 18-inch long pieces of 2"×6" and 5/4×6 that were end-matched. One piece of 2×6 and one piece of 5/4×6 were placed into three separate tubs and weighed down with lead weights. Then, one tub was filled with CTC solution that had 7.5 g/L or 0.75% of copper, one tub with 5.6 g/L (0.56%) and one tub with 3.6 g/L (0.36%), in amounts sufficient to immerse the wood. The tubs were then placed into a pressure vessel, wherein a modified full cell treatment of 15 in. Hg for 15 minutes followed by 5 min at 140 psig was applied to the three tubs and their contents. The cylinder was then opened and the tubs removed and emptied. The boards were weighed, with the 5/4×6 boards averaging 30.4 pcf solution retention while the 2×6 boards averaged 26.0 pcf.

A one-inch piece (2"×6"×1") was cut from the center of each 2"×6" for later leaching testing, and the remaining pieces of the 2×6 and the 5/4×6 were returned into the cylinder. The cylinder was pressurized with 30 psig of carbon dioxide gas for 20 minutes and then emptied. An additional one-inch piece was removed from the 2×6 for leaching analysis. The wood pieces were soaked in 300 ml of distilled water for 28 hours, with the water analyzed thereafter. The amounts of leaching for the CTC only treated samples were 4.3, 1.9 and 4.3 times the amounts relative to the carbon dioxide treated boards for the 7.5, 5.6 and 3.6 g/L treatments, respectively. Thus, the fixation procedures resulted in significantly less copper leaching.

Another experiment was done using 5/4×6×12 inch pieces of southern pine. Three pieces were put in each of four tubs. The tubs were filled with a CTC solution containing 0.66% copper. Tubs 1 and 2 had no boric acid, tub 3 had 0.5% boric acid, and tub 4 had 1.0% boric acid. The tubs and their contents were then placed in a pressure vessel, wherein a modified full cell treatment of 15 in. Hg for 15 minutes followed by 20 min at 140 psig was applied. The cylinder was opened and the tubs removed and emptied. The boards were weighed, and they averaged 30.5 pcf of copper solution. One board from each tub was removed and the remaining boards were returned to the cylinder. A vacuum of 20 in. Hg was pulled for 20 minutes and then immediately carbon dioxide was introduced. The carbon dioxide pressure was increased to 20 psig for 20 minutes. One inch pieces were then cut from the boards, and the pieces were leached in 300 ml of deionized water for 24 hours. Since the three copper only treated boards did not have a vacuum to remove excess solution, their leach value was reduced by ⅓ since repeated trials have shown that about ⅓ of the solution is removed by the vacuum. On that basis, the copper only leached 2.7, 2.7 and 2.4 times that of the carbon dioxide treated samples with 0%, 0.5% and 1.0% boric acid, respectively.

Other treatments were completed with larger amounts of wood. For example, some treatments were done with four 2×6×8 and ten 5/4×6×8 in each charge, while some were done with nineteen or twenty 2×4×8. Generally, good penetration and retention was obtained for the copper, and leaching tests were favorable.

Example 4

The amount of ammonia emitted from CTC-only treated wood was compared to the amount of ammonia emitted from wood treated using an embodiment of the inventive method.

Ten 2×6×96 in. Southern Pine boards were cut in half, with one half of the boards marked as "A" and the other half of the boards marked as "B". Each board was numbered and weighed. All of the wood was placed in a treating cylinder and treated with a liquid solution prepared using CTC, ammonia and water. After the board were exposed to a vacuum of 10 in. Hg for 15 minutes, the cylinder was filled with the liquid CTC solution containing 0.75% copper as metal under vacuum and then pressurized up to 145 psig with air. The air pressure valve was closed. After 20 minutes the pressure had gradually decreased to 60 psig as the liquid solution was adsorbed by the wood. The remaining pressure was slowly released; the cylinder was then emptied of excess solution, and then a maximum vacuum of 24 in. Hg was exerted for 40 min. The cylinder door was opened and an ammonia reading was taken in the cylinder after 1 minute using an ammonia meter. The meter indicated 29 ppm ammonia.

All of the boards were removed from the cylinder and weighed. The "A" boards were placed in a tent (described below) while the "B" boards were returned to the cylinder.

A 24 in. Hg vacuum was reestablished in the cylinder, and then carbon dioxide gas was admitted into the cylinder up to a pressure of 5 psig for 10 min. After 10 minutes, the pressure was released, the door opened, and an ammonia reading was taken in the cylinder after 1 minute using an ammonia meter. The meter indicated 0 ppm ammonia. After removing the "B" boards from the cylinder, the boards were again weighed and then placed in a separate tent.

The two tents were constructed of planks over sawhorses covered with polyethylene film that extended down all sides to the floor. The test boards were placed on a lower shelf of one sawhorse in 2 stacks of 5 boards such that the bottom boards were approximately 6 in. above the floor. Both tents were approximately 28 (w)×31 (h)×95 (l) inches, were not completely sealed, and thus did allow minimal air to enter the tented space.

The ammonia reading was 55 ppm one hour after the CTC-only (no exposure to carbon dioxide) boards had been placed in the tent. The ammonia reading for the carbon dioxide treated boards one hour after being placed in the tent was 30 ppm. At that time, there were still minute bubbles of carbon dioxide emerging from the wood. The bubbling ceased after a few hours. After 4 days in the tents, the CTC-only boards (no exposure to carbon dioxide) had an ammonia reading of 35 ppm, while the carbon dioxide-exposed boards had a reading of 8 ppm.

Evaluation of Ammonia-MEA Mixtures

A series of treatments was done to evaluate incorporating MEA into the ammonia-carbon dioxide protocol. The series included treatments that were 100% ammonia, 75:25 ammonia-MEA, 50:50 ammonia-MEA, 25:75 ammonia-MEA and 100% MEA. These were done in separate containers.

The appropriate copper-containing solutions were made and two boards of 2×6×12 in. Hem Fir (A and B) were placed in each container. All of the boards were treated at the same time by placing the containers in the cylinder and doing the copper treatment portion. The cylinder was then opened and the boards removed from the containers. The containers were emptied of solution and the boards placed in the empty containers. A full vacuum was applied to obtain the target retention and the cylinder reopened. The "B" boards were removed and set aside. The "A" boards were returned to the cylinder and treated with carbon dioxide. About 30 minutes after removal from the cylinder, the boards were cut and a 1 in. wafer removed and placed in 300 ml of distilled water. After 24 hours of soaking with occasional shaking, the water was sampled and the copper content determined. Tables 22 and 23 present the results.

Within the group treated with carbon dioxide (Table 22), the samples with 100% $NH_3$ leached the least while adding MEA increased the degree of leaching. Normalization to the 100% $NH_3$ value shows the effect of MEA addition quite readily.

TABLE 22

Samples Exposed to Carbon Dioxide

| NH3 | MEA | Board No. | Sample No. | Copper Retn., pcf | Leachate, ppm | Leach, % | Normalized |
|---|---|---|---|---|---|---|---|
| 100 | 0 | HF-2 | 1A | 0.177 | 61 | 4.8% | 1.0 |
| 75 | 25 | HF-3 | 2A | 0.204 | 85 | 5.8% | 1.2 |
| 50 | 50 | HF-2 | 3A | 0.205 | 96 | 6.5% | 1.4 |
| 25 | 75 | HF-2 | 4A | 0.217 | 134 | 8.6% | 1.8 |
| 0 | 100 | HF-2 | 5A | 0.268 | 161 | 8.3% | 1.7 |

The samples that were not exposed to carbon dioxide (Table 23) had greater retention and had greater leaching. The leaching also was somewhat variable. Normalization of the leaching values in Table 23 is to the 100% $NH_3$ with $CO_2$ in Table 1 and generally the leaching is 2 to 4 times worse.

TABLE 23

Samples Without Carbon Dioxide

| NH3 | MEA | Board No. | Sample No. | Copper Retn., pcf | Leachate, ppm | Leach, % | Normalized |
|---|---|---|---|---|---|---|---|
| 100 | 0 | HF-4 | 1B | 0.259 | 319 | 17.1% | 3.6 |
| 75 | 25 | HF-4 | 2B | 0.278 | 416 | 20.7% | 4.3 |
| 50 | 50 | HF-3 | 3B | 0.229 | 137 | 8.3% | 1.7 |
| 25 | 75 | HF-3 | 4B | 0.261 | 170 | 9.0% | 1.9 |
| 0 | 100 | HF-3 | 5B | 0.330 | 224 | 9.4% | 2.0 |

After four days at ambient conditions, retention and penetration were evaluated. The retention values are in the above tables. Generally, the retentions are high. The penetrations were generally similar between the samples with and without the carbon dioxide fixation although increasing amounts of MEA seemed to improve the penetration somewhat.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Treated refractory softwood comprising
refractory softwood, and
a copper-containing compound formed in situ within the refractory softwood by exposing an aqueous solution of a copper ammine complex to carbon dioxide, carbonic acid, or a mixture thereof,
wherein the copper-containing compound penetrates at least about 80% of the treated refractory softwood as determined using AWPA Standard A72, and
wherein the leaching of sectioned treated refractory softwood after 14 days as determined using AWPA Standard E11 is less than 25% of the total copper present in the sectioned treated refractory softwood.

2. The treated refractory softwood according to claim 1, wherein the treated refractory softwood further comprises a zinc-containing compound.

3. The treated refractory softwood according to claim 1, wherein the refractory softwood is Douglas Fir.

4. The treated refractory softwood according to claim 1, wherein the refractory softwood is Hem Fir.

5. The treated refractory softwood according to claim 1, wherein the refractory softwood is Spruce-Pine-Fir.

6. The treated refractory softwood according to claim 1, wherein the refractory softwood is Red Pine.

7. The treated refractory softwood according to claim 1, wherein the refractory softwood is Jack Pine.

8. The treated refractory softwood according to claim 1, wherein the treated refractory softwood comprises about 0.01 to about 0.5 lbs/$ft^3$ of copper as determined using AWPA Standard A9.

9. The treated refractory softwood according to claim 8, wherein the treated refractory softwood comprises about 0.06 to about 0.15 lbs/$ft^3$ of copper as determined using AWPA Standard A9.

10. The treated refractory softwood according to claim 9, wherein the treated refractory softwood is a dimensioned wood product.

11. The treated refractory softwood according to claim 8, wherein the treated refractory softwood comprises about 0.1 to about 0.35 lbs/$ft^3$ of copper as determined using AWPA Standard A9.

12. The treated refractory softwood according to claim 11, wherein the treated refractory softwood is a dimensioned wood product.

13. The treated refractory softwood according to claim 1, wherein the treated refractory softwood is a dimensioned wood product.

14. The treated refractory softwood according to claim 1, wherein the treated refractory softwood is a dimensioned wood product.

15. The treated refractory softwood according to claim 1, wherein the copper-containing compound penetrates at least about 90% of the treated refractory softwood as determined using AWPA Standard A72.

16. The treated refractory softwood according to claim 1, wherein the copper-containing compound is formed in situ within the refractory softwood by exposing an aqueous solution of a copper ammine complex to carbon dioxide, and wherein the copper ammine complex is copper tetraammine carbonate.

17. The treated refractory softwood according to claim 1, wherein the copper-containing compound is formed in situ within the refractory softwood by exposing an aqueous solution of a copper ammine complex to carbonic acid, and wherein the copper ammine complex is copper tetraammine carbonate.

* * * * *